US009648055B2

(12) United States Patent
Pai et al.

(10) Patent No.: US 9,648,055 B2
(45) Date of Patent: May 9, 2017

(54) APPLICATIONS IN A FLEXIBLE REGISTRATION FRAMEWORK

(71) Applicant: Ayla Networks, Inc., Sunnyvale, CA (US)

(72) Inventors: Vishwesh Pai, Milpitas, CA (US); Sudha Sundaresan, San Jose, CA (US); Adrian Caceres, Los Gatos, CA (US)

(73) Assignee: Ayla Networks, Inc., Santa Clara, CA (US)

( * ) Notice: Subject to any disclaimer, the term of this patent is extended or adjusted under 35 U.S.C. 154(b) by 198 days.

(21) Appl. No.: 14/515,407

(22) Filed: Oct. 15, 2014

(65) Prior Publication Data
US 2016/0112470 A1  Apr. 21, 2016

(51) Int. Cl.
*H04L 29/06* (2006.01)
*H04L 12/24* (2006.01)

(52) U.S. Cl.
CPC ...... *H04L 65/1073* (2013.01); *H04L 41/0806* (2013.01)

(58) Field of Classification Search
CPC ............... H04L 41/0806; H04L 41/082; H04L 41/0813; H04L 41/0803; H04L 65/1073; H04L 69/329; H04W 60/00
USPC ................................................ 709/205; 726/1
See application file for complete search history.

(56) References Cited

U.S. PATENT DOCUMENTS

| 6,941,148 | B2* | 9/2005 | Hansmann | ............... | H04L 29/06 342/457 |
| 8,447,843 | B2 | 5/2013 | Johnson et al. | | |
| 8,611,881 | B2* | 12/2013 | Kowalewski | ....... | H04L 65/1069 379/202.01 |
| 2002/0059479 | A1* | 5/2002 | Hardy | .................... | G06F 13/385 710/1 |
| 2002/0133581 | A1 | 9/2002 | Schwartz et al. | | |
| 2002/0169883 | A1* | 11/2002 | Bright | ............... | H04L 29/12188 709/230 |
| 2004/0002338 | A1* | 1/2004 | Spartz | ................... | H04W 88/06 455/450 |

(Continued)

OTHER PUBLICATIONS

International Search Report and Written Opinion of the International Searching Authority for PCT Application No. PCT/US2015/047277 mailed Jan. 19, 2016.

*Primary Examiner* — Tae Kim
(74) *Attorney, Agent, or Firm* — Lowenstein Sandler LLP

(57) ABSTRACT

A processing device executing an application that is logged in to a user account recognized by a registration service receives information identifying a device that has not been bound to any user account, wherein the application supports a plurality of registration techniques. The processing device identifies a registration technique supported by the device that is to be used for registration of the device. The processing device performs at least one of sending information associated with the registration technique to the device or receiving the information associated with the registration technique. The processing device sends the information associated with the registration technique to the registration service, and then receives a message from the registration service, wherein the message indicates that the information satisfied a criterion of the registration technique and comprises a notification that the device is bound to the user account.

20 Claims, 16 Drawing Sheets

(56) References Cited

U.S. PATENT DOCUMENTS

| | | | |
|---|---|---|---|
| 2004/0015952 A1* | 1/2004 | Lajoie | G06F 8/65 |
| | | | 7/171 |
| 2006/0212361 A1 | 9/2006 | Perkowski | |
| 2007/0038573 A1 | 2/2007 | Kanchwala | |
| 2008/0010381 A1 | 1/2008 | Barraclough | |
| 2009/0150549 A1* | 6/2009 | Young | G06F 9/54 |
| | | | 709/227 |
| 2009/0280776 A1* | 11/2009 | Chen | H04L 63/08 |
| | | | 455/411 |
| 2009/0313026 A1* | 12/2009 | Coffman | G06F 17/30899 |
| | | | 704/275 |
| 2010/0208634 A1* | 8/2010 | Eng | H04L 45/00 |
| | | | 370/310 |
| 2012/0011233 A1* | 1/2012 | Dixon | H04L 67/10 |
| | | | 709/221 |
| 2012/0173603 A1 | 7/2012 | Okamoto | |
| 2013/0006400 A1* | 1/2013 | Caceres | H04L 12/2803 |
| | | | 700/90 |
| 2013/0198027 A1 | 8/2013 | Anthonyson et al. | |
| 2013/0227653 A1 | 8/2013 | Choi | |
| 2013/0232243 A1 | 9/2013 | Johnson et al. | |
| 2013/0298215 A1 | 11/2013 | Kuznetsov et al. | |
| 2013/0308493 A1 | 11/2013 | Viswanathan et al. | |
| 2014/0189080 A1 | 7/2014 | Dixon et al. | |

* cited by examiner

APPLICATIONS IN A FLEXIBLE REGISTRATION FRAMEWORK

BACKGROUND

Many modern appliances, consumer devices, and other devices include embedded systems that are configured to perform one or more dedicated functions. However, most embedded systems of such devices do not include networking capabilities, role based access control capabilities, remote interface capabilities, remote control capabilities, or related capabilities. Designing such functionality into an embedded system, designing application programming interfaces (APIs) for accessing such functionality, designing web services capable of communicating with and controlling the embedded system via this added functionality, and designing applications for taking advantage of this functionality can consume considerable resources of the device manufacturer.

Moreover, many devices such as those that include embedded systems require user registration to enable certain features and/or to make the devices usable. Conventionally, each such device has a single registration technique that is coded into that device during manufacturing.

BRIEF DESCRIPTION OF THE DRAWINGS

Reference will now be made to the accompanying drawings showing example embodiments of the present application, and in which.

DESCRIPTION OF EXAMPLE EMBODIMENTS

Figure 1:
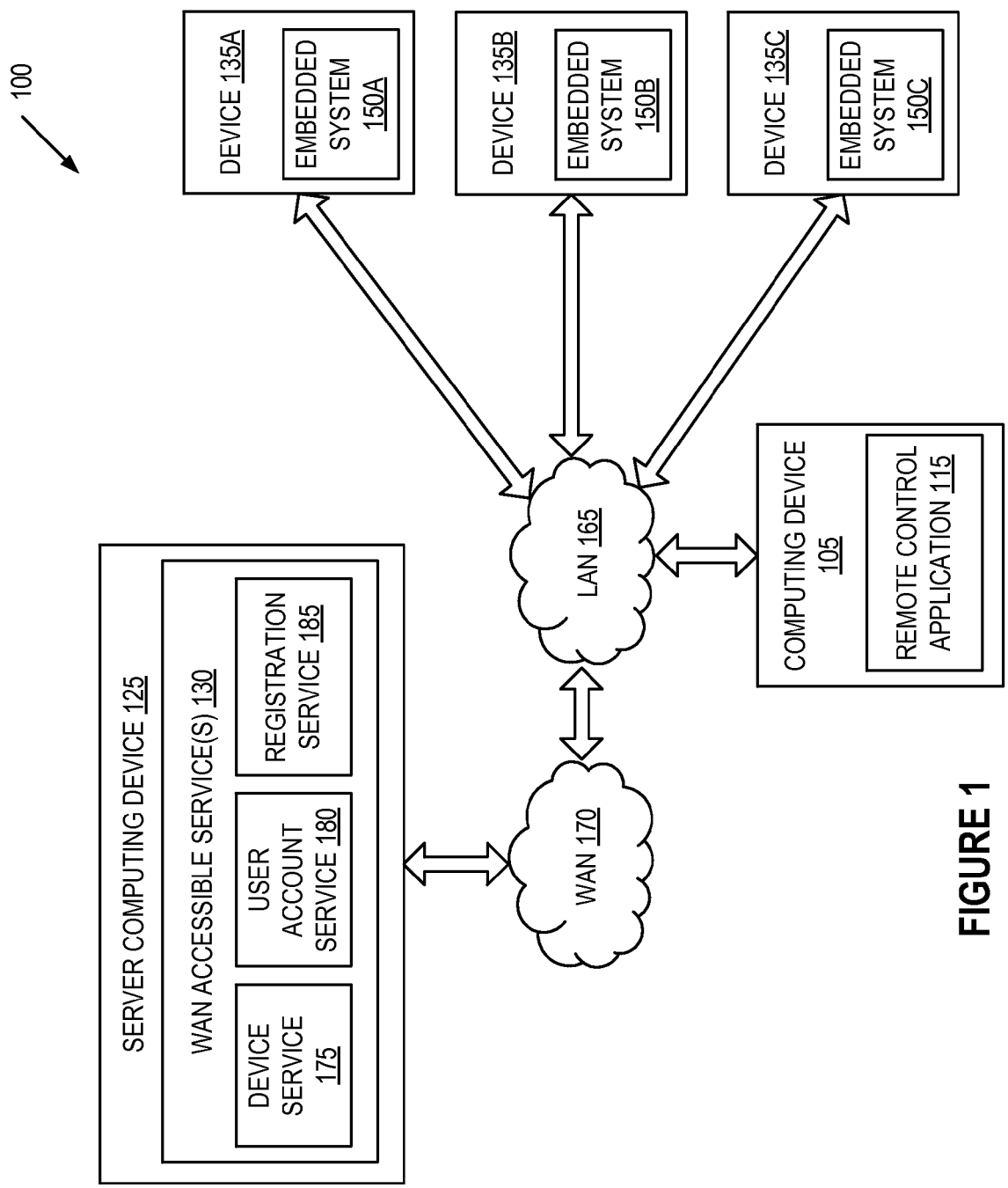
FIG. 1 is a block diagram depicting an example network architecture including remotely accessible embedded systems.

Embodiments are directed to a network-connected device platform (also referred to as an internet-of-things (IoT) cloud platform or simply an IoT platform) having a flexible registration framework that provides flexible control of registration techniques to be used for binding devices to user accounts.

There are numerous different registration techniques that may be used to register devices. Each of these registration techniques provides different tradeoffs in terms of security and convenience to a user. Moreover, each registration technique may rely on one or more underlying technologies to complete device registration. Accordingly, the registration techniques that may be available for a device may depend on the capabilities of the device.

Conventionally, a device manufacturer (e.g., an original equipment manufacturer (OEM)) weighs the benefits, limitations and requirements of available registration techniques and selects a particular registration technique for their products during product development. The device manufacturer then hard codes the single selected registration technique into their products. The device manufacturer may also set up an online registration service that facilitates registration of the devices using that single registration technique. Notably, such registration services are also coded to support only the single registration technique that is used by all of the manufacturer's products.

Embodiments described herein set forth a registration framework that includes a registration service, applications and devices that work together to register the devices. The registration framework supports numerous different registration techniques, and may register devices using any of the supported registration techniques. Each of the applications and devices also support one or more registration techniques. Moreover, at any time additional registration techniques may be added to any of the applications, devices, or registration service. Thus, the registration framework provides the flexibility to select different optimal registration techniques to apply depending on who is performing the registration, the device being registered, an application facilitating the registration, and/or other environmental conditions.

In one embodiment, a registration service receives information identifying a first device, a second device to be registered and an application running on the first device, wherein the application is logged in to a user account recognized by the registration service. The registration service determines a registration technique that is supported by both the application and by the second device, and then sends a message indicating the registration technique to at least one of the first device or the second device. The application and the second device may then each perform operations associated with the registration technique to complete registration and bind the second device to the user account.

In another embodiment, a mobile device (or other computing device) executes an application that supports multiple registration techniques and that is logged in to a user account recognized by a registration service. The application receives information identifying a device that has not been bound to any user account. The application then identifies a registration technique supported by the device that is to be used for registration of the device. In some instances, this determination is made by querying the registration service. Depending on the identified registration technique, the application may then receive registration information from a user, receive registration information from the device, send registration information to the device and/or send registration information to the registration service. The registration service then determines whether registration is successful and sends a notification to the application and/or the device indicating that the registration information satisfied a criterion of the registration technique and that the device is bound to the user account.

In another embodiment, a device such as an embedded system establishes a connection to a local area network (LAN) and then provides data to a registration service via the connection to the LAN. The device then receives from the registration service an instruction to implement a specified registration technique. Responsive to the instruction, the device implements the specified registration technique, wherein the registration service is to bind the embedded system to a user account responsive to satisfaction of a criterion of the specified registration technique. Numerous other embodiments are discussed herein that relate to flexible application of registration techniques to bind devices to user accounts.

Referring now to the figures, FIG. 1 is a block diagram depicting an example network architecture 100 including remotely accessible embedded systems 150A-C and computing devices 105, 125 that interact with the embedded systems. The network architecture 100 includes multiple devices 135A-C and a computing device 105 executing a remote control application 115 that are connected to a local area network (LAN) 165, and further includes multiple wide area network (WAN) accessible services 130 connected to a WAN 170. The WAN accessible services 130 may be components of an IoT platform that OEMs can leverage to quickly and easily create new network-connected device products. The IoT platform will handle authorization and authentication, network connection, device registration, information gathering and analytics, device management, role based access control and more. The registration service 185 of the IoT platform, the remote control application 115 and the embedded systems 150A-C together form a flexible registration framework for registering devices 135A-C. The flexible registration framework enables OEMs to choose registration techniques for their devices based on desired security levels, ease of use and/or other considerations. The flexible registration framework additionally enables the OEMs to easily change the registration techniques to be used by any of their devices, and to update those devices accordingly. The registration techniques may be changed dynamically without any change to device side software.

The devices 135A-C are devices with embedded systems 150A-C, and may include, for example, electrical appliances such as refrigerators, ovens, washers, driers, dishwashers, thermostats, alarms, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as HVAC systems, traffic lights, factory controllers, signs, electronic billboards, sprinkler systems, and irrigation control systems, as well as medical devices. Devices 135A-C may also be any other type of device that includes an embedded system.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to a LAN 165 or to a wireless carrier network (e.g., that is implemented using various data processing equipment, communication towers, etc.). The communication module may be configured to manage security, manage sessions, manage access control, manage user registration, manage communications with external devices, and so forth. In one embodiment, the communication module is configured to communicate using Wi-Fi®. Alternatively, the communication module may be configured to communicate using Bluetooth®, Zigbee®, Z-wave, wireless universal serial bus (USB)™, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. If the communication module is configured to communicate with a wireless carrier network, then the communication module may communicate using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology. One example of an embedded system is described in greater detail below with reference to FIG. 14.

Referring back to FIG. 1, the LAN 165 may include a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 150A-C may not support any of the communication types supported by the network device. For example, device 135A may support Zigbee, and device 135B may support Bluetooth. To enable such devices to connect to the LAN 165, the LAN 165 may include a gateway device (not shown) connected to the network device via one of the connection types supported by the network device (e.g., via Ethernet or Wi-Fi). The gateway device may additionally support other communication protocols such as Zigbee, PLC and/or Bluetooth, and may translate between supported communication protocols. Accordingly, some devices may connect to the LAN 165 through the gateway device.

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to a server computing device 125. The server computing device 125 may include a physical machine and/or a virtual machine hosted by a physical machine. The physical machine may be a rackmount server, a desktop computer, or other computing device. In one embodiment, the server computing device 125 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts one or more WAN accessible services 130, which may be a web based service and/or a cloud service (e.g., a web based service hosted in a cloud computing platform). In one embodiment, the WAN accessible services 130 include a device service 175, a user account service 180 and a registration service 185. Alternatively, the functionality of one or more of the device service 175, user account service 180 and/or registration service 185 may be combined into a single service or may be divided into multiple services. For example, the functionality of the registration service 185 may be incorporated into the device service 175 in some embodiments.

Device service 175 may maintain a session (e.g., via a continuous or intermittent connection) with one or more of the embedded systems 150A-C. Alternatively, the device service 175 may periodically establish sessions with the embedded systems 150A-C. Via a session with an embedded system 150A-C, device service 175 may issue commands to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded systems 150A-C may identify values or states of some or all detectable parameters of devices 135A-C that the embedded systems are included in. Status updates may also include fault information, statistical device usage information, trace data and/or other information. Such values, states and/or other information may change based on direct user interaction with the devices. Such values, states and/or other information may also change responsive to commands sent to the embedded systems 150A-C by the device service 175 and/or by computing device 105. By maintaining or periodically establishing sessions with the embedded systems 150A-C, the device service 175 may maintain up-to-date information on the states of the devices 135A-C.

User account service 180 performs authorization and authentication of applications. Applications (e.g., remote control application 115) may provide identification of a particular user account maintained by user account service 180 as well as credentials such as a password, biometric information, a one-time password (OTP), etc. to user account service 180. User account service 180 may use the credentials to authenticate the application to a particular user account. Once the application is authenticated, user account service 180 may provide a session token to the application. This session token may be used to identify the particular user account that the application is logged into as well as a role or roles of the user account, devices that the user account has permission to access (e.g., devices owned by the holder of the user account), and so on. The application may then provide the session to token to other WAN accessible services 130 (e.g., device service 175 and/or registration service 185) to show that the application is associated with a particular user account. Each of the WAN accessible services 130 recognize the user account, and will permit access to particular resources (e.g., to particular devices) based on the user account associated with the session token.

Computing device 105 may be a portable device such as an electronic book reader, portable digital assistant, mobile phone, laptop computer, portable media player, tablet computer, camera, video camera, netbook, notebook, and the like. Computing device 105 may also be a traditionally stationary device such as a desktop computer, gaming console, digital video disc (DVD) player, media center, and the like. Computing device 105 may connect to the WAN 170 and/or to the LAN 165.

Computing device 105 may include a remote control application (or multiple remote control applications) 115 that can receive information for devices 135A-C and control the devices 135A-C. The remote control application 115A-C is configured to interface with and/or control one or more of the devices 135A-C via the devices' embedded systems 150A-C. The remote control application 105 may be programmed to run on various operating systems, such as Windows® operating systems, Unix® operating systems, iOS® operating systems, Android® operating systems and Java® operating systems to name a few. The remote control application 105 may also be configured as firmware, or as hardware, or as some combination of software, firmware and/or hardware. The remote control application 105 may include a graphical user interface (GUI) that enables users to interact with and control devices 135A-C in an intuitive and user-friendly manner. A user may interact with the GUI to cause the remote control application to generate notifications, commands, property updates and other messages for the devices represented in the GUI.

In one embodiment, the computing device 105 includes separate remote control applications for each of the embedded systems 150A-C. Alternatively, the computing device 105 may include a single remote control application that is capable of communicating with and controlling embedded systems 150A-C for multiple different devices 135A-C.

While computing device 105 is connected to WAN 170 or directly to a LAN 165, remote control application 115 may establish a session with the user account service 180. Via this session, the remote control application 115 may interface with device service 175 and registration service 185. The device service 175 may provide an interface for indirectly controlling and monitoring one or more of the devices 135A-C. If a user desires to change a state of a device, the user may issue a command via the remote control application 115, and that command may be sent to the device service 175. The device service 175 may then forward the command on to the appropriate embedded system. Additionally, when the device service 175 receives updated state information for a device from an embedded system, the device service 175 may forward the state information on to the remote control application 115. This may enable users to connect to and control the devices 135A-C from anywhere they have access to the Internet.

A user account may gain access to a device 135A-C by registering that device to the user account or by another user account sharing access to the device 135A-C. Registration of the device causes the device to be bound to a particular user account.

Registration service 185 is responsible for coordinating with devices 135A-C and remote control applications 115 to register devices 135A-C to a user account. Registration service 185 supports a large number of registration techniques that may be performed to register a device. Each remote control application 115 may support one or more registration techniques. Additionally, each of the devices 135A-C may support one or more registration techniques, which may differ from device to device. The registration techniques supported by application 115 may be different than the registration techniques supported by devices 135A-C. In order for a device to successfully be registered to a user account, there should be overlap of at least one registration technique that is supported by both the remote control application 115 and the device 135A-C. Registration service 185 may identify and select a registration service that is supported by both the remote control application 115 and a device 135A-C, and then instruct the remote control application 115 and device 135A-C to use the selected registration technique. Alternatively, if the remote control application 115 supports only a single registration technique that is the same as a single registration technique supported by the device, then the device and remote control application may automatically apply that single registration technique.

One or both of the remote control application 115 and device 135A-C may then generate or collect appropriate registration information and provide the registration information to the registration service 185. The registration service 185 determines whether the received registration information satisfies one or more criteria of the selected registration technique, and if so binds the device 135A-C to the user account associated with the remote control application 115. Once the device is registered to the user account, the remote control application 115 can begin controlling the device 135A-C.

Figure 2:
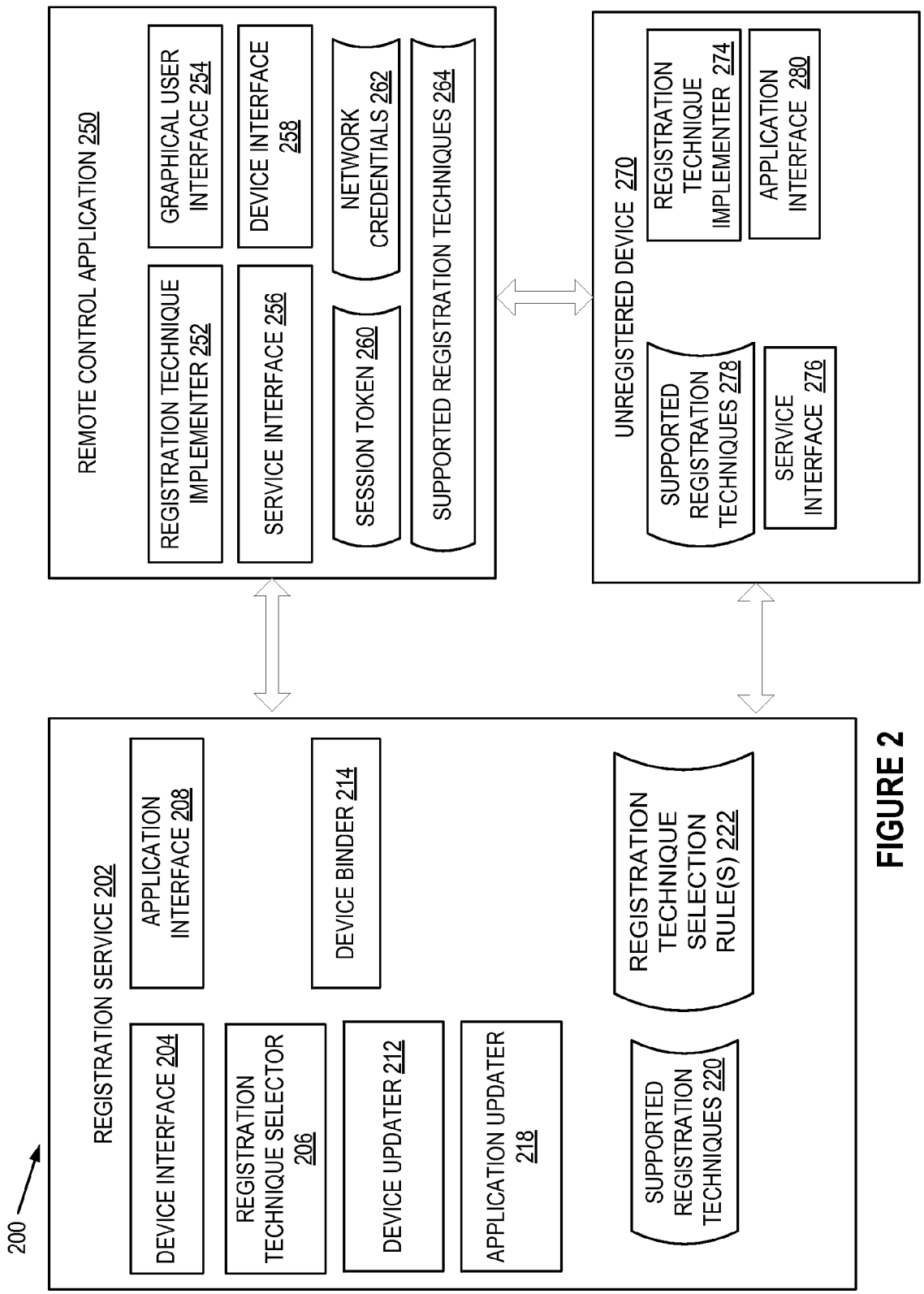
FIG. 2 is a block diagram of a flexible registration framework, in accordance with one embodiment of the present invention.

FIG. 2 is a block diagram of a flexible registration framework 200, in accordance with one embodiment of the present invention. The registration framework 200 includes a registration service 202, a remote control application 250 and an unregistered device 270. The registration service 202, remote control application 250 and unregistered device 270 may coordinate to register the unregistered device 270.

Registration service 202 manages the registration and deregistration of devices such as embedded systems to user accounts. In one embodiment, registration service 202 corresponds to registration service 185 of FIG. 1. Registration service 202 may include a device interface 204, an application interface 208, a registration technique selector 206, a device updater 212, a device binder 214, and/or an application updater 218. Alternatively, the functionality of one or more of the device interface 204, application interface 208, registration technique selector 206, device updater 212, device binder 214, and/or application updater 218 may be combined into a single module or divided into multiple sub-modules.

Device interface 204 is responsible for connecting to and communicating with embedded systems and/or other devices (e.g., unregistered device 270). Device interface 204 may connect to embedded systems or other devices whether or not those devices have been registered to any user accounts. Device interface 204 may receive data from embedded systems (or other devices) such as location information, addressing information (e.g., internet protocol (IP) addresses), device identifiers (IDs), registration information, and so forth. Device interface 204 may additionally send information to devices such as device updates (e.g., firmware updates), commands to use particular registration techniques, registration confirmation, and so on.

Application interface 208 is responsible for connecting to remote control applications (e.g., remote control application 250). Application interface 208 may receive a session token from a remote control application, and may query a user account service to determine a user account associated with the session token. The user account service may also identify devices registered to the user account. Application interface 275 may provide the remote control application with instructions to use particular registration techniques for registration of a device, with application updates, and with other information. Application interface 208 may additionally receive application information, addressing information, registration information, and/or other information from remote control applications.

Remote control application 205 is an application that interfaces with and/or controls one or more devices (e.g., one or more devices having embedded systems). Remote control application 205 may be a program or library that is executed by a processing device (e.g., by a processor of computing device 105 of FIG. 1). The remote control application 205 may be programmed to run on various operating systems, such as Windows® operating systems, Unix® operating systems, iOS® operating systems, Android® operating systems and Java® operating systems to name a few. The remote control application 205 may also be configured as firmware, or as hardware, or as some combination of software, firmware and/or hardware. In one embodiment, the remote control application 205 includes a graphical user interface (GUI) 254, a registration technique implementer 252, a service communicator 256, and a device communicator 258. In other embodiments, the functionality of some or all of the GUI 254, registration technique identifier 252, service communicator 256, and/or device communicator 258 may be combined into a single module or divided into additional modules. The remote control application 205 may also include a session token 260, network credentials 262 and/or data identifying supported registration techniques 264.

Graphical user interface (GUI) 254 enables users to interact with and control devices in an intuitive and user-friendly manner. GUI 254 may provide a collection of graphical icons, visual indicators, buttons, toggles, sliders, and so forth that represent states and values of different parameters for the devices as well as controls for changing those states and values. A user may interact with the GUI 254 to cause the remote control application to generate notifications, commands, property updates and other messages for the devices represented in the GUI. A user may additionally interact with GUI 254 to perform one or more operations associated with device registration.

Device interface 256 is responsible for connecting to and communicating with embedded systems and/or other devices (e.g., unregistered device 270). Device interface 256 may establish limited connections to embedded systems or other devices while those devices are unregistered. Via the limited connection, device interface 256 may provide the unregistered device 270 with network credentials 262 to enable the unregistered device 270 to connect to a network (e.g., to a LAN). Device interface 256 may additionally receive registration information from the unregistered device 270 and/or send registration information to the unregistered device 270 via the limited connection.

Service interface 256 is responsible for connecting to registration service 202, a device service and/or other WAN accessible services of an IoT platform. Service interface 256 may send a session token to the registration service 202 to authenticate the remote control application 250 to a particular user account. Service interface 256 may receive instructions to use particular registration techniques for registration of a device, receive application updates, and/or receive other information from the registration service 202. Service interface 256 may additionally send to registration service 202 application information, addressing information, registration information, and/or other information.

Unregistered device 270 is a device that has not yet been registered to any user account. Unregistered device 270 may be a device having an embedded system, or may be any other computing device that is to connect to an IoT platform. In one embodiment, unregistered device 270 corresponds to a device 135A-C or embedded system 150A-C of FIG. 1. Unregistered device 270 may include a service interface 276, an application interface 280 and/or a registration technique implementer 274. Alternatively, the functionality of one or more of the service interface 276, application interface 280 and/or registration technique implementer 274 may be combined into a single module or divided into multiple sub-modules.

Service interface 276 is responsible for connecting to registration service 202, a device service and/or other WAN accessible services of a IoT platform. Service interface 276 may receive instructions to use particular registration techniques for registration of the unregistered device 270, receive device updates, and/or receive other information from the registration service 202. Service interface 276 may additionally send to registration service 202 device information, addressing information, registration information, and/or other information.

Application interface 280 is responsible for connecting to remote control applications (e.g., remote control application 250). Application interface 280 may provide the remote control application with registration information. Application interface 280 may additionally receive application information, addressing information, registration information, and/or other information from remote control applications.

When a device (e.g., unregistered device 270) is purchased by an end user, that device may initially not be registered to any user accounts. The end user may desire to register the device to his user account to gain access to and control over that device. For example, a user may purchase and install an Internet enabled oven, dishwasher, dryer or washer. By registering the Internet enabled device to a user account that the remote control application 250 is logged into, the remote control application 250 gains the ability to monitor and/or control that device. In one embodiment, the remote control application 250 may be granted one of multiple different permission levels through the registration process. A first permission level may permit monitoring of a device, but not permit any control of the device. A second permission level may permit control of some (e.g., a subset of all) device functions or settings, and a third permission level may permit control of all device functions and settings, as an example.

To register the device 270, the end user first downloads and installs the remote control application 250 on a different computing device (e.g., on a mobile device). Alternatively, the user may already have remote control application 250 installed on his or her computing device. Via the remote control application 250, the end user logs into a user account service (e.g., user account service 180) and receives a session token 260 that binds the remote control application 250 to the user account for the duration of a session. The user may generate a new user account if the end user does not already have a user account.

Once the remote control application 250 is logged into the user account of the end user, the remote control application provides the session token 260 to registration service 202, and may request registration of a new device (e.g., of unregistered device 270). In one embodiment, the remote control application 250 automatically detects unregistered device 270 and sends a registration request to the registration service 202. The registration request may include information about the detected device, such as an internet protocol (IP) address, a media access control (MAC) address, a serial number, identifying information of a LAN that the device is connected to, location information, or other information that can be used to uniquely identify the device. Alternatively, a user may request registration of a new device via GUI 254, which may cause a registration request to be sent to registration service 202. The user may input a type of device to be registered, a serial number of the device, or other information that identifies the device.

Instead of, or in addition to, remote control application 250 generating a registration request, unregistered device 270 may generate a registration request and send the registration request to registration service 202. In one embodiment, unregistered device 270 generates a registration request responsive to detecting remote control application 250. Unregistered device 270 may receive information about the remote control application (e.g., an IP address associated with remote control application 250, a MAC address associated with remote control application 250, session token 260, etc.) that may be used to identify remote control application 250, and may include such information in the registration request.

Responsive to registration service 202 receiving a registration request, registration technique selector 206 determines a registration technique to be used to register the unregistered device 270. Registration service 202 has multiple supported registration techniques 220. Similarly, unregistered device 270 has one or more supported registration techniques 278 and remote control application 250 has one or more supported registration techniques 264. Registration service 202 supports all registration techniques that are supported by any of the devices and remote control applications. Unregistered device 270 is likely to support just one or a few registration techniques. Remote control application 250 may support all of the same registration techniques supported by registration service 202, or may support a subset of such registration techniques.

To select a registration technique, registration technique selector 206 determines the supported registration techniques 264 of the remote control application 250 and the supported registration techniques 278 of the unregistered device 270. Registration technique selector 206 then determines if there is any overlap between supported registration techniques 264 and supported registration techniques 278.

Registration technique selector 206 may apply one or more registration technique selection rules 222 to select a registration technique. In one embodiment, a simple registration technique selection rule is applied that selects a registration technique based on overlapping registration techniques. If a single overlapping registration technique is identified, registration technique selector 206 may select the overlapping registration technique and notify the remote control application 250 and/or the unregistered device 270 of the registration technique to use. If multiple overlapping registration techniques are identified, then registration technique selector 206 may determine which of the overlapping registration techniques to select. A registration technique selection rule 222 may indicate that a registration selection technique with a highest security level is to be applied. Alternatively, a registration selection technique selection rule 222 may indicate that one of the overlapping registration techniques is to be selected based on one or more other criteria. For example, a registration technique selection rule 222 may indicate that a particular registration technique is to be selected based on a location of the unregistered device 270, or based on a role of the user account that the remote control application 250 is logged into.

In one example, a registration technique selection rule 222 indicates that a registration technique is to be selected based on a location of the unregistered device 270. For example, an OEM may specify that a first registration technique is to be used for devices in Europe, a second registration technique is to be used for devices in China, and a third registration technique is to be used for devices in the United States. Registration technique selector 206 may determine a location of the unregistered device 270 based on an IP address of the unregistered device, based on cell tower triangulation, based on Wi-Fi access point triangulation, or based on global positioning system (GPS) coordinates received from the unregistered device, for example. Registration technique selector 206 may then select the registration technique designated for the determined location.

In another example, a registration technique selection rule 222 indicates that a registration technique is to be selected based on a role of the user account that the remote control application 250 is logged into. User accounts may be associated with one or more roles. Each role is associated with a type of user, and provides a set of permissions or privileges with regards to one or more devices. Examples of roles include an end user role, an OEM administrator role, an OEM account manager role, a technician role, a dealer role, and so on. Accordingly, a first registration technique may be used if a dealer is installing the unregistered device 270 in a customer's home, and a second registration technique may be applied if the customer is installing the unregistered device 270 herself. Many other registration technique selection rules may also be applied.

Once a registration technique is selected, device interface 204 may notify unregistered device 270 of the registration technique to be used. Additionally, or alternatively, application interface 208 may notify remote control application 250 of the registration technique to be used.

Each of the remote control application 250 and unregistered device 270 may include a registration technique implementer 252, 274 that implements a selected registration technique for device registration. The registration technique implementer 274 and registration technique implementer 252 each perform one or more registration operations associated with device registration. The specific registration operations that are performed depend on the specific registration technique that was selected. Examples of operations that may be performed by registration technique implementer 252 include receiving registration information from unregistered device 270, prompting a user to input registration information, generating registration information, sending registration information to unregistered device 270, and sending registration information and/or other information to registration service 202. Examples of registration operations that may be performed by unregistered device 270 include receiving registration information from remote control application 250, generating registration information, sending registration information to remote control application 250, and sending registration information and/or other information to registration service 202.

Registration service 202 receives registration information from one or both of remote control application 250 and unregistered device 270. Device binder 214 then determines whether the received registration information satisfies one or more registration criteria of the selected registration technique. The registration criteria may differ from registration technique to registration technique. If the registration criteria of the registration technique are satisfied, device binder 214 binds the unregistered device to the user account that the remote control application 250 is logged into. Device binder 214 may additionally send a notification of successful device registration to the remote control application 250 and/or unregistered device 270. Remote control application 250 may then gain access to unregistered device 270 (which is now registered).

As mentioned, the remote control application 250 and unregistered device 270 may perform different registration operations depending on a selected registration technique. Additionally, the types of registration information that is gathered may differ between registration techniques and the registration criteria may differ for different registration techniques. A few examples of registration techniques are provided herein below. Many other registration techniques may also be used in embodiments.

In a first example registration technique, the remote control application 250 causes a screen of a mobile device that the remote control application is running on to pulsate. The duration of pulses and spacing between pulses may provide a code. The unregistered device 270 includes a detector (e.g., a light sensor) that detects the pulses. The unregistered device 270 identifies the code and then forwards the code to registration service 202. Remote control application 250 additionally sends the code to registration service 202. Registration service 202 determines whether the code received from the unregistered device 270 matches the code received from remote control application 250. If they match, then the registration criteria are satisfied and registration is successful.

In a second example, the unregistered device 270 includes a display (e.g., a liquid crystal (LCD) display, a light emitting diode (LED) display, an organic light emitting diode (OLED) display, an electronic ink (e-ink) display, a plasma display panel, a cathode ray tube (CRT), etc.), and the unregistered device 270 displays a unique code via the display. A user views the unique code and enters it into the remote control application 250. The remote control application 250 and the unregistered device 270 both send the unique code to the registration service 202. Registration service 202 compares the unique code received from the remote control application 250 to the unique code received from the unregistered device 270. If they match, then registration is successful.

In a third example, a user of the remote control application receives a unique code from a web site, via a text message, via email, or via another means. The unique code may be sent to the remote control application 250, or the user may be asked to input the unique code into the application.

The remote control application 250 may then send the unique code to the unregistered device 270 or the user may be asked to input the unique code into the unregistered device 270 via an input device of the unregistered device 270. Both the remote control application 250 and the unregistered device 270 send the unique code to the registration service 202, which compares the received codes to determine if registration successful.

In a fourth example, remote control application 250 may connect to the unregistered device 270 directly or via a LAN. The unregistered device 270 may send the unique code to the remote control application 250 via the connection. In one embodiment, unregistered device 270 broadcasts the unique code. In one embodiment, unregistered device 270 begins broadcasting the unique code responsive to a user pushing a button on the unregistered device 270. Remote control application 250 and unregistered device 270 may send the unique code to the remote control application 250. Registration service 202 compares the unique code received from the remote control application 250 to the unique code received from the unregistered device 270. If they match, then registration is successful.

In a fifth example, unregistered device 270 includes a bar code (e.g., a two-dimensional bar code such as a quick response (QR) code or a 1 dimensional bar code such as a universal product code (UPC)). The remote control application 250 includes a bar code scanner or an image capture device that captures the bar code on the unregistered device 270. The remote control application 250 may transmit the bar code to the registration service 202. The unregistered device 270 may also transmit the bar code to the registration service. Alternatively, the registration service may include a data structure (e.g., a table, database, etc.) that matches bar codes to unique identifying information of each device, such as MAC addresses, serial numbers, etc. Registration service 202 may compare the received bar codes to one another, or may compare a single received bar code to the data structure to identify the device that is to be registered. If the bar codes match, then registration is successful, and registration service 202 binds the unregistered device 270 to the user account. Alternatively, if the bar code received from the remote control application 250 matches a bar code in the data structure, registration service 202 determines an unregistered device corresponding to the bar code and binds that unregistered device to the user account.

In a sixth example, remote control application 250 and unregistered device 270 are on the same LAN, and remote control application 250 detects the unregistered device 270 on the LAN (e.g., via the san list of the Wi-Fi devices connected to the LAN). Remote control application 250 sends information identifying the unregistered device and address information showing that the unregistered device and the remote control application are on the same LAN to the registration service 202. Registration service 202 may then register the device to the user account associated with the remote control application. In a variation of the sixth example, the unregistered device 270 additionally sends a token (e.g., a unique code) to remote control application 250, which the unregistered device 270 may also transmit to the registration service 202 (or which the registration service 202 may look up in a data structure). Registration service 202 may apply a registration technique having a first criterion that the remote control application 250 be on a same LAN as the unregistered device 270 and a second criterion that a token received from the unregistered device 270 match a token received from the remote control application 250. Responsive to both criteria being satisfied, registration service 202 may bind the unregistered device 270 to a user account.

The binding of the unregistered device 270 to the user account may be recorded by the registration service 202. The binding information may be saved as an entry in the user account, for example. In one embodiment, the information identifying the user account to which the device is bound (and any information identifying the owner of the device, individuals who have access to the device, etc.) is stored in a server data store (e.g., in the cloud) and not in the device 270. Such information may also not be stored in the remote control application 250 in embodiments. Accordingly, even upon the loss or compromise of the device 270 or a mobile device that includes the remote control application 250, no customer identifiable information is compromised (e.g., no customer information can be obtained from the device 270).

Embodiments herein describe a registration service as making a registration decision (determining whether or not registration information satisfies the criteria of a registration technique). However, it should be understood that in alternative embodiments the unregistered device 270 and/or remote control application 250 may make the registration decision. For example, unregistered device 270 may provide registration information to remote control application 250, and remote control application 250 may then determine whether the received registration information (potentially in combination with additional registration information that may be received from registration service 202, received from a user or generated by remote control application 250) satisfies criteria of the selected registration technique. Remote control application 250 may then notify the registration service that registration is or is not successful, responsive to which device binder 214 may bind the device to the user account if appropriate. Similarly, remote control application 250 may send registration information to unregistered device 270, and the unregistered device may use such registration information to make a registration decision. Unregistered device 270 may then notify the registration service 202 of the registration decision.

Moreover, embodiments herein describe a registration service determining a registration technique to be applied by a remote control application 250 and an unregistered device 270. However, in alternative embodiments the remote control application 250 and/or unregistered device 270 may determine which registration technique to apply. For example, remote control application 250 may include a registration technique selection rule, and may apply the registration technique selection rule to determine which registration technique to use. Similarly, unregistered device 270 may include and apply a registration technique selection rule to select a registration technique.

New registration techniques may be added to the supported registration techniques 220 at any time without making any changes to the existing code of the registration service 202. Moreover, registration techniques to be used for registering of devices may be changed without making any updates to software or firmware of those devices. In one embodiment, a registration technique to be used by a device may be changed simply by sending an instruction to that device and/or to a remote control application that will interface with that device. This enables registration techniques to be easily changed on-the-fly, even for devices that have already been sold and deployed to customer locations. In one embodiment, registration service 220 is managed as a plugin or extension.

Additional registration techniques may also be added to remote control application 250 and/or unregistered device 270 at any time. Some registration technique selection rules may select a registration technique to be used even if that registration technique is not supported by one or both of the remote control application 250 and/or unregistered device 270. If a registration technique is selected that is not supported by remote control application 250, application updater 218 updates remote control application 250 to cause remote control application 250 to support that registration technique. Application updater 218 may download an update that includes the selected registration technique to remote control application 250, and remote control application 250 may be updated based on the update. Similarly, if a registration selection technique is selected that is not supported by unregistered device 270, device updater 212 may download a firmware update to unregistered device 270 that will cause unregistered device 270 to support the selected registration technique. Unregistered device 270 may then execute the update to support the selected registration technique.

The registration framework 200 has been described with reference to registering an unregistered device 270. However, it should be understood that in some embodiments the device to be registered may be a registered device. In such embodiments, the described operations may be performed to re-register the device. Re-registration is registration of an already registered device to a new user account. Some registration techniques support re-registration, while other registration techniques do not support re-registration. If a selected registration technique does not support re-registration, then an owner may deregister themselves from a device to enable registration of the device to a new user account. If device binder 214 determines that the selected registration technique does support re-registration, then reregistration may be performed without deregistering the device. In one embodiment re-registration causes the device to no longer be bound to a user account that the device was originally bound to before re-registration was performed. In another embodiment, re-registration causes the device to be bound to the new user account without affecting the binding to the original user account.

Figure 3:
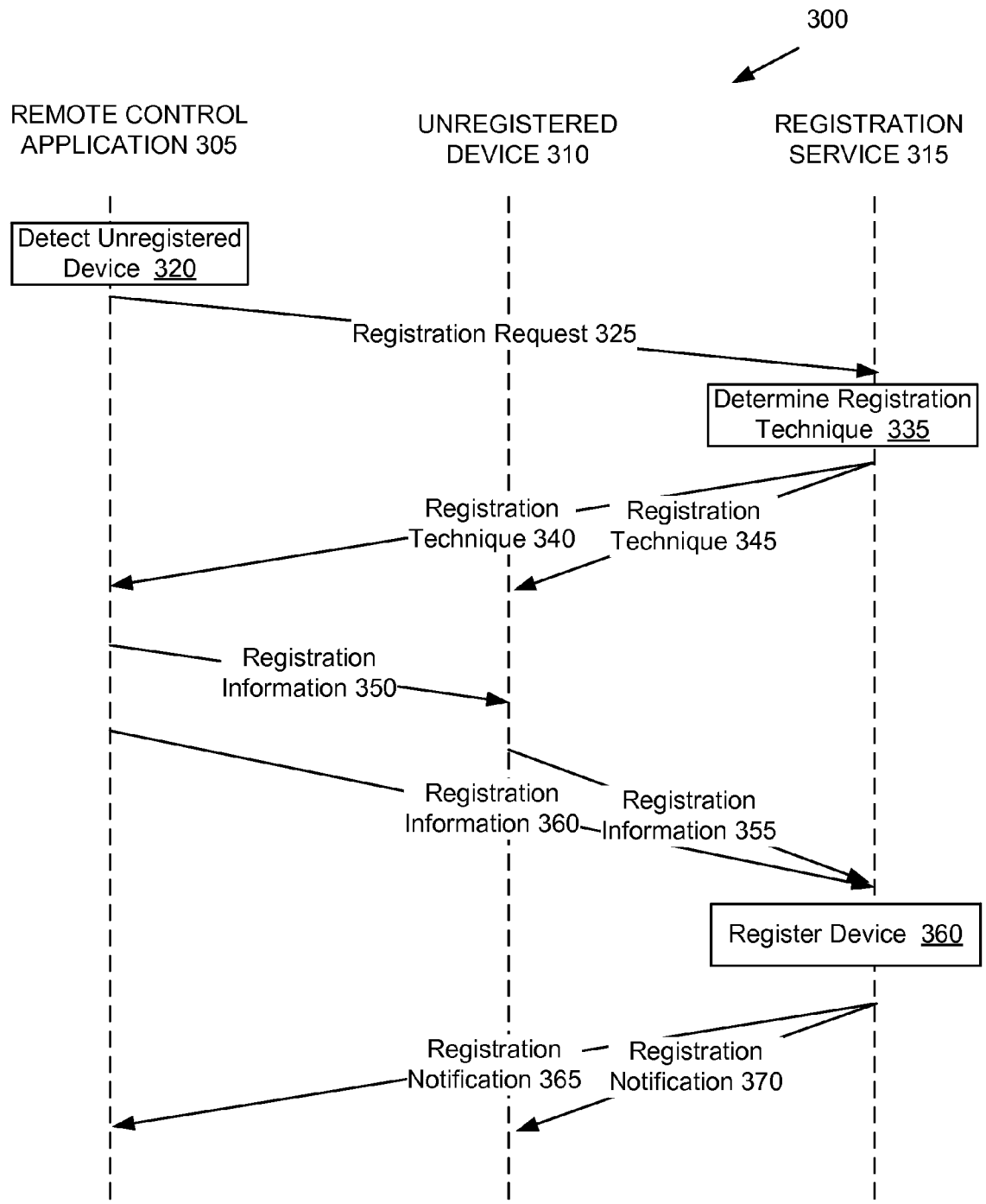
FIG. 3 is a sequence diagram of an example registration process, in accordance with one embodiment.

FIG. 3 is a sequence diagram 300 of an example registration process, in accordance with one embodiment. At block 320 a remote control application 305 detects an unregistered device 310. Remote control application 305 then sends a registration request 325 to a registration service 315.

At block 335, the registration service 315 determines a registration technique to be used for registering the unregistered device 310. Registration service 335 may then notify 340, 345 the unregistered device 310 and/or the remote control application 305 of the determined registration technique. In an alternative embodiment, registration service 315 may not notify remote control application 305 or unregistered device 310 of the registration technique to be used. For example, if the remote control application 305 and unregistered device 310 include only a single registration technique (that matches), or if remote control application 305 and unregistered application 310 have the same default registration technique, then the registration technique notification may be omitted.

Remote control application 305 transmits registration information 350 (e.g., a unique code or token) to unregistered device 310. Unregistered device 310 and remote control application 305 then both transmit the registration information 355, 360 to registration service. Registration service 315 compares the received registration information, and if they match registers the device by binding it to a user account associated with the remote control application 305. Registration service 315 then notifies 365, 370 the remote control application 305 and/or the unregistered device 310 of the successful registration.

FIGS. 4A-12 are flow diagrams showing various methods of device registration in an IoT platform. The methods may be performed by a processing logic that may comprise hardware (e.g., circuitry, dedicated logic, programmable logic, microcode, etc.), software (e.g., instructions run on a processing device to perform hardware simulation), or a combination thereof. Various embodiments may be performed by a service computing device executing a registration service (e.g., server computing device 125 of FIG. 1), by a remote control application running on a computing device (e.g., remote control application 115 of FIG. 1), and/or by a network-connected (or Internet enabled) device that may include an embedded system (e.g., devices 135A-C of FIG. 1).

Figure 4A:
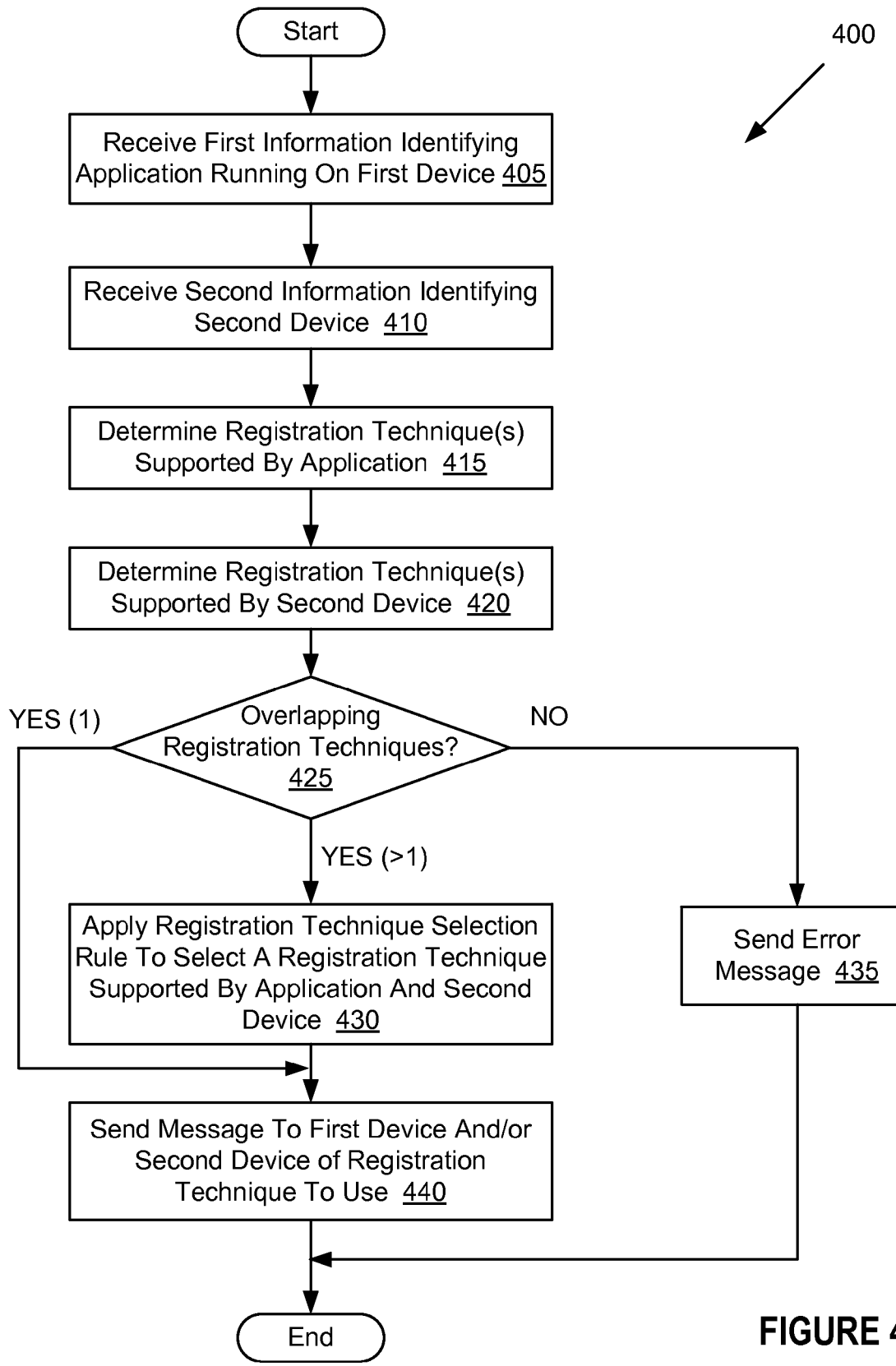
FIG. 4A is a flow chart of one embodiment for a method of determining a registration technique to be used for a device.

FIG. 4A is a flow chart of one embodiment for a method 400 of determining a registration technique to be used for a device. In one embodiment, method 400 is performed by a server computing device executing a registration service. At block 405 of method 400, processing logic receives first information identifying an application running on a first device. At block 410, processing logic receives second information identifying a second device (e.g., an unregistered device). The first information and second information may be separately received from the first device and the second device, or may both be received from one of the first device or the second device. The first information may include a device type of the device on which the application is running, a version number of the application, a MAC address of the first device, an IP address of the first device, and so on. The second information may include an IP address of the second device, a serial number of the second device, a MAC address of the second device, a device type of the second device, and so on.

At block 415, processing logic determines one or more registration techniques that are supported by the application based on the received first information. At block 420, processing logic determines one or more registration techniques supported by the second device based on the second information.

At block 425, processing logic determines registration techniques that are supported by both the application and by the second device (overlapping registration techniques). If there is just one overlapping registration technique, the method continues to block 440. At block 440, processing logic sends a message to the first device and/or the second device indicating the registration technique to use. For example, if the application supports two registration techniques and the second device supports a single registration technique, then the application may be notified of the registration technique supported by the second device. In another example, if the application supports registration techniques A and B, and the second device supports registration techniques B and C, then processing logic may notify the application and the second device that registration technique B is to be used. In one embodiment, if the application and the second device both support only a single registration technique, which is the same, then the operations of block 440 may be skipped.

If at block 425 the application and the second device have more than one overlapping registration technique, the method continues to block 430. At block 430, processing logic applies a registration technique selection rule to select one of the registration techniques supported by both the application and the second device. The registration technique selection rule may select a registration technique based on a security level associated with the technique, based on a role of a user account that the application is associated with, based on a location of the second device, and/or based on other criteria. For example, each registration technique may have a security rating, and processing logic may select a registration technique having a highest security rating. The method continues to block 440, and processing logic notifies one or both of the application and the second device of the selected registration technique.

If at block 425 there were no overlapping supported registration techniques between the application and the second device, then the method proceeds to block 435, and an error message is sent. Alternatively, processing logic may update one or both of the application and the second device to cause them to support an additional registration technique. At this point the method would return to block 425.

Figure 4B:
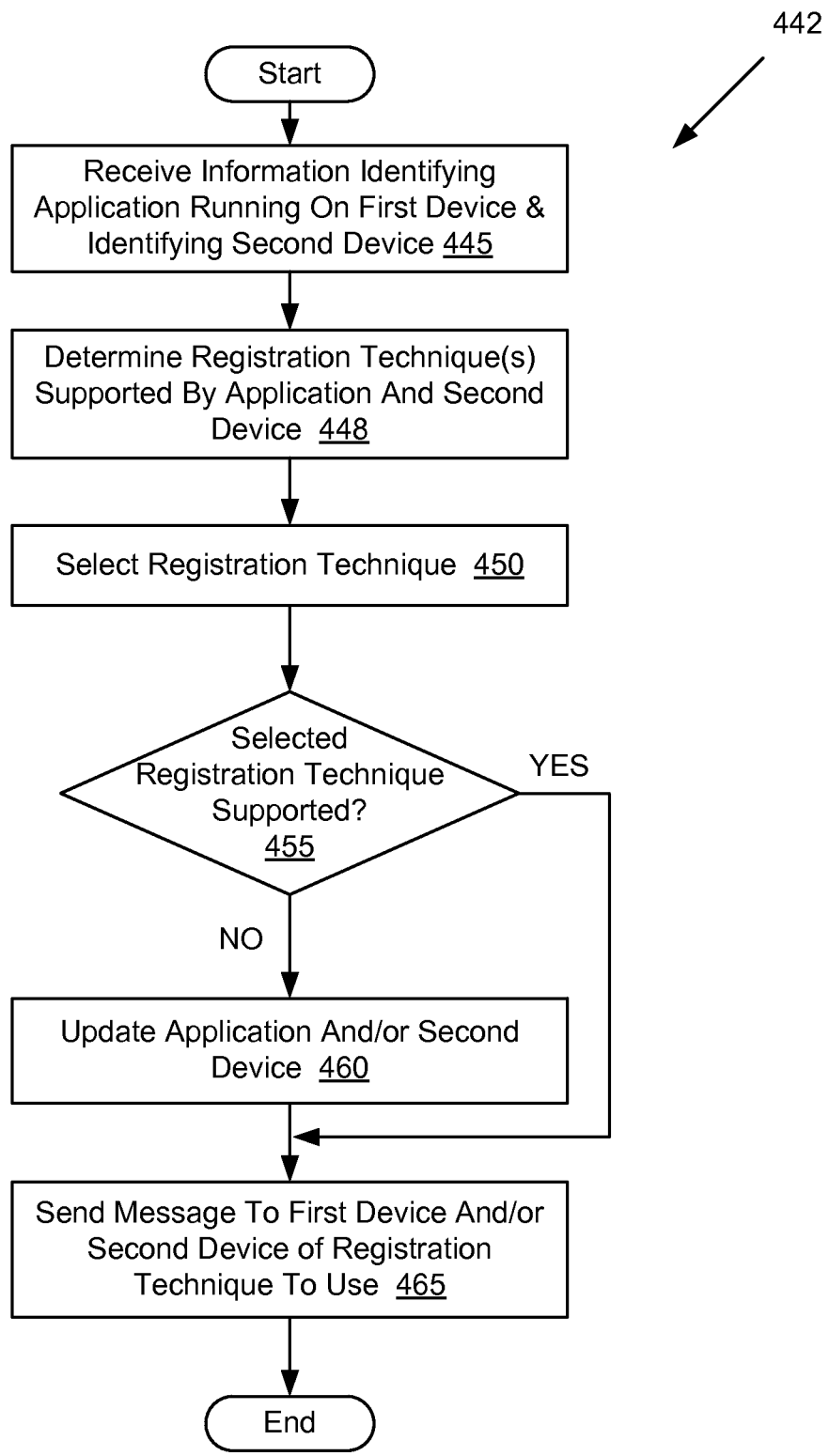
FIG. 4B is a flow chart of another embodiment for a method of determining a registration technique to be used for a device.

FIG. 4B is a flow chart of another embodiment for a method 442 of determining a registration technique to be used for a device. In one embodiment, method 442 is performed by a server computing device executing a registration service. At block 445 of method 400, processing logic receives information identifying an application running on a first device and information identifying a second device. At block 448, processing logic determines one or more registration techniques that are supported by the application and by the second device based on the received information.

At block 450, processing logic applies one or more registration technique selection rules to select a registration technique. A simple registration technique selection rule may select a registration technique that is shared by the application and the second device. Other registration technique selection rules may select a registration technique based on location of the first and/or second device, based on a role associated with the application, based on security level, and/or based on other criteria. The supported registration techniques of the application and/or the second device may or may not be taken into consideration when selecting the registration technique.

At block 455, processing logic determines whether the selected registration technique is supported by both the application and the second device. If either the application or the second device fail to support the selected registration technique, the method continues to block 460. If the selected registration technique is supported by both the application and the second device, the method proceeds to block 465.

At block 460, the application and/or the second device are updated to cause them to support the selected registration technique. This may include downloading a firmware and/or software update to one or both of the first device and the second device, and causing the first device and/or second device to install the update. At block 465, processing logic notifies one or both of the application and the second device of the selected registration technique to be used. In one embodiment, no notification message is sent to a device that was updated at block 460, as the update itself may include an instruction to apply the registration technique.

Figure 5A:
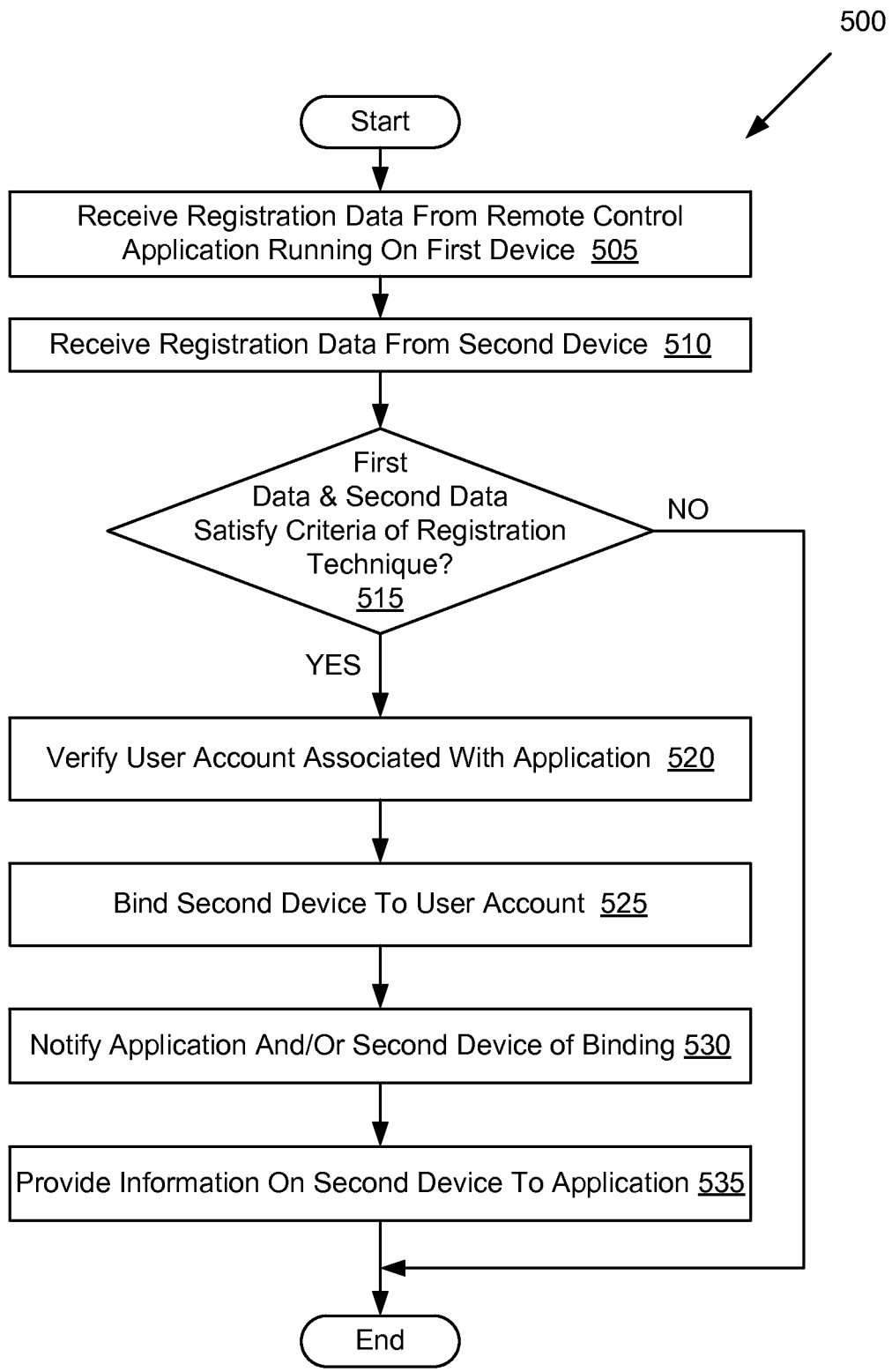
FIG. 5A is a flow chart of one embodiment for a method of binding a device to a user account based on an applied registration technique.

FIG. 5A is a flow chart of one embodiment for a method 500 of binding a device to a user account based on an applied registration technique. In one embodiment, method 500 is performed by a server computing device executing a registration service. At block 505 of method 500, processing logic receives registration data from a remote control application running on a first device. At block 510, processing logic receives registration data from a second device. Alternatively, processing logic may receive registration data from just the remote control application or just from the second device.

At block 515, processing logic determines whether the first registration data and the second registration data satisfy one or more criteria of a registration technique that is to be used. In one embodiment, processing logic determines whether the first registration data includes a unique code or token that matches a unique code or token in the second registration data. In other embodiments, processing logic may additionally or alternatively determine whether a location of the first device and/or second device satisfy a location criterion, whether the first device and second device are on the same LAN, whether a role of a user account associated with the remote control application has registration permissions, and/or may apply other criteria. If the received registration data satisfies the one or more criteria, then registration is successful and the method continues to block 520. Otherwise, registration fails and the method ends.

At block 520, processing logic may verify the user account associated with the application (e.g., by checking a session token received from the application). At block 525, processing logic binds the second device to the verified user account. At block 530, processing logic notifies the remote control application and/or the second device of the successful registration. At block 535, processing logic may then provide information on the second device to the remote control application. The remote control application would then be able to monitor and control the second device remotely via a device service.

Figure 5B:
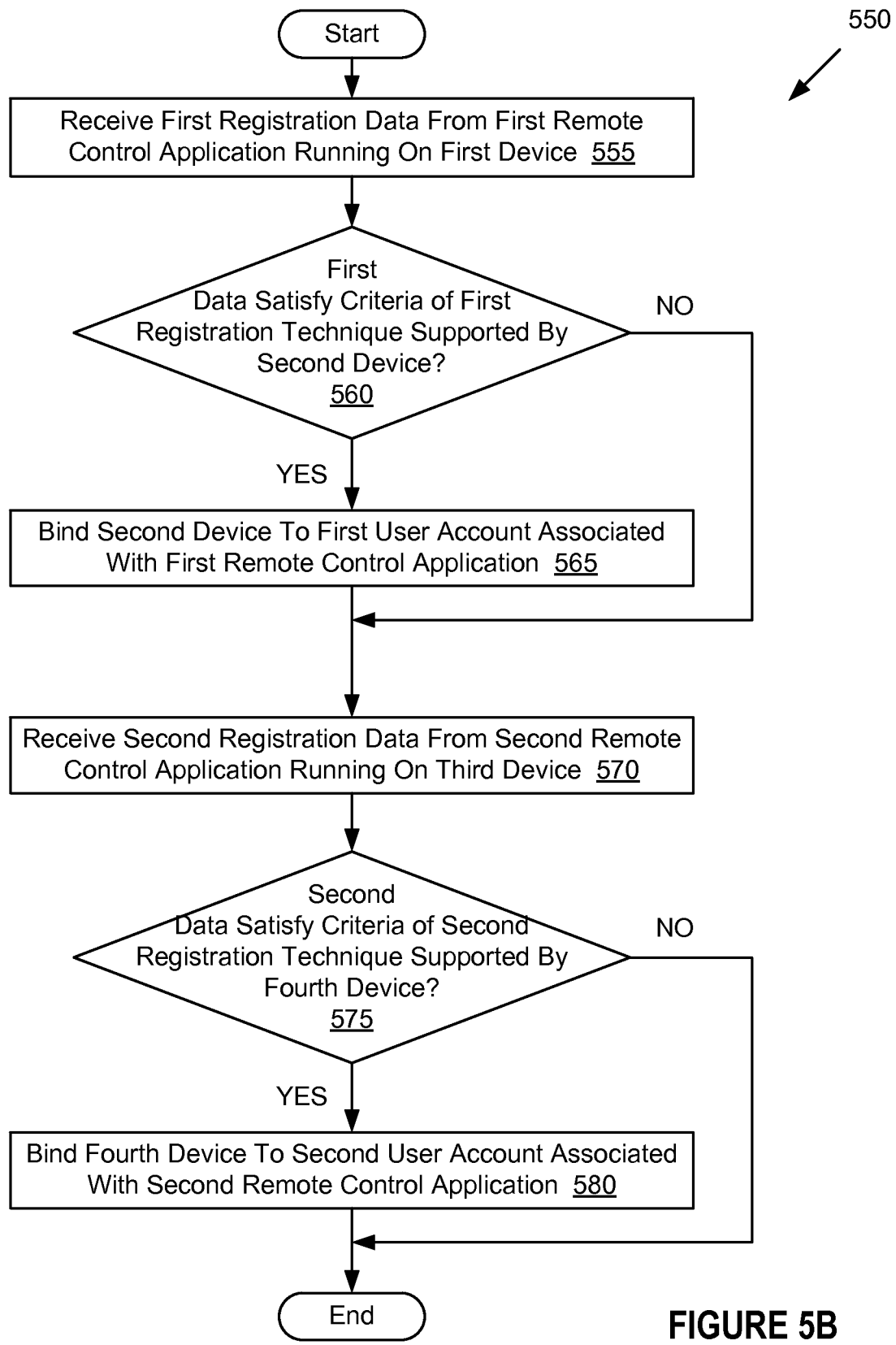
FIG. 5B is a flow chart of one embodiment for a method of binding multiple devices to different user accounts based on different applied registration techniques.

FIG. 5B is a flow chart of one embodiment for a method 550 of binding multiple devices to different user accounts based on different applied registration techniques. In one embodiment, method 550 is performed by a server computing device executing a registration service. At block 555 of method 500, processing logic receives first registration data from a first remote control application running on a first device. Processing logic may additionally receive registration data from a second device that is to be registered.

At block 560, processing logic determines whether the first registration data satisfies one or more criteria of a first registration technique that is to be used. If the received registration data satisfies the one or more criteria, then registration is successful and the method continues to block 565 at which processing logic binds the second device to a first user account associated with the first remote control application. Otherwise, registration fails and the method proceeds to block 570.

At block 570, processing logic receives second registration data from a second remote control application running on a second device. Processing logic may additionally receive registration data from a fourth device that is to be registered. At block 575, processing logic determines whether the second registration data satisfies one or more criteria of a second registration technique that is to be used. If the received registration data satisfies the one or more criteria, then registration is successful and the method continues to block 580 at which processing logic binds the fourth device to a second user account associated with the second remote control application. Otherwise, registration fails and the method ends.

Though method 550 is described with reference to registering two devices using two different registration techniques, many different devices may be registered using the same or different registration techniques.

Figure 6:
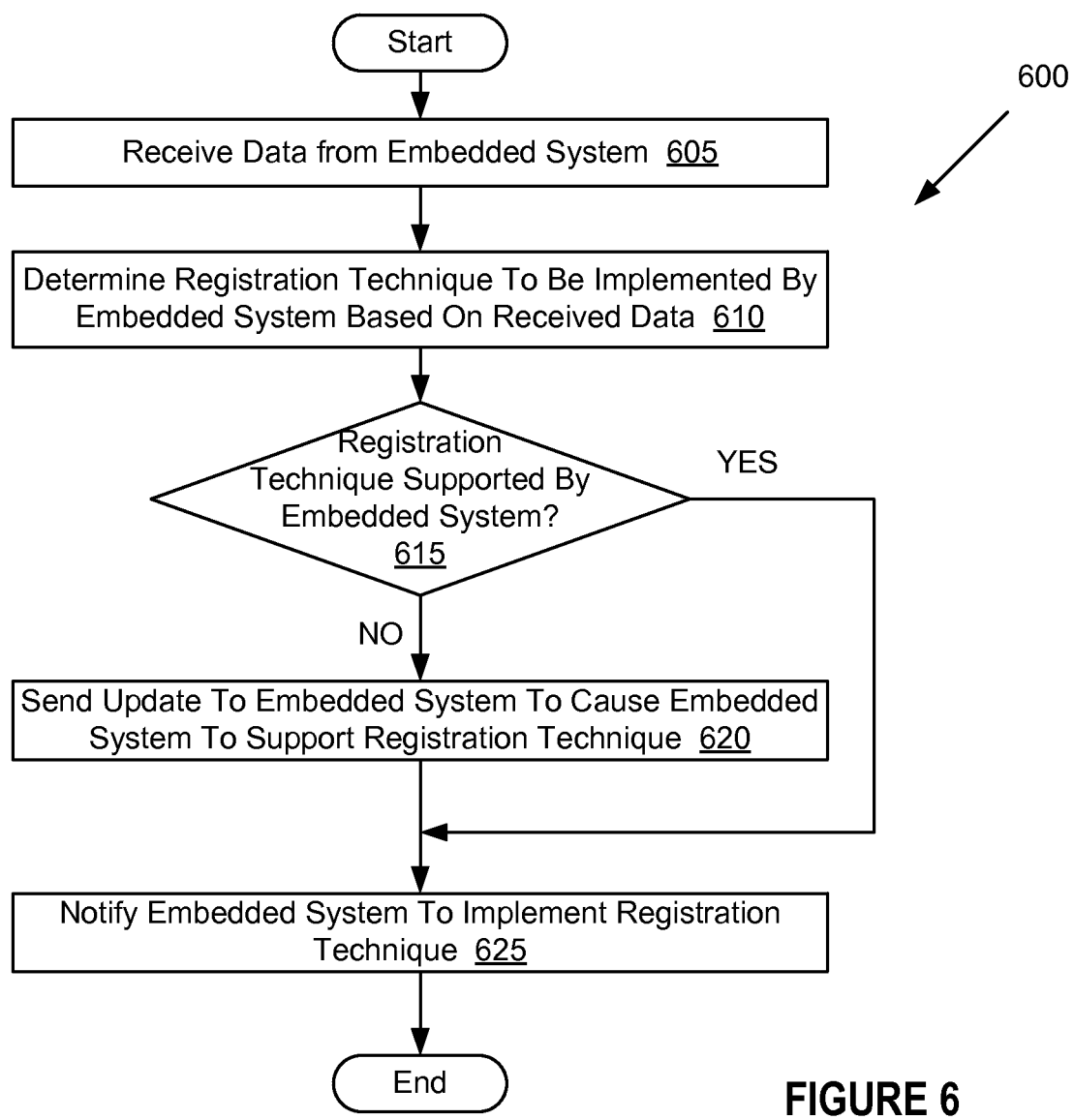
FIG. 6 is a flow chart of one embodiment for a method of dynamically controlling the registration technique to be implemented by an embedded system.

FIG. 6 is a flow chart of one embodiment for a method 600 of dynamically controlling the registration technique to be implemented by an embedded system. In one embodiment, method 600 is performed by a server computing device executing a registration service. At block 605 of method 600, processing logic receives data from an embedded system. The received data may include a unique identifier of the embedded system (e.g., a serial number, MAC address, etc.), an address of the embedded system (e.g., an IP address and/or port number) and/or a device type of the embedded system. At block 610, processing logic determines a registration technique to be implemented by the embedded system. The registration technique may have been selected by an OEM that manufactured a device that includes the embedded system.

At block 615, processing logic determines whether the embedded system supports the registration technique. If the embedded system supports the registration technique, the method continues to block 625. Otherwise, the method proceeds to block 620, at which processing logic sends an update to the embedded system to cause the embedded system to support the determined registration technique. At block 625, processing logic notifies the embedded system to implement the registration technique. Depending on the registration technique, implementing the registration technique may include waiting for registration information from an application and forwarding such registration information to a registration service, sending registration information to an application, broadcasting registration information, displaying registration information on a screen, and/or performing other operations.

Figure 7:
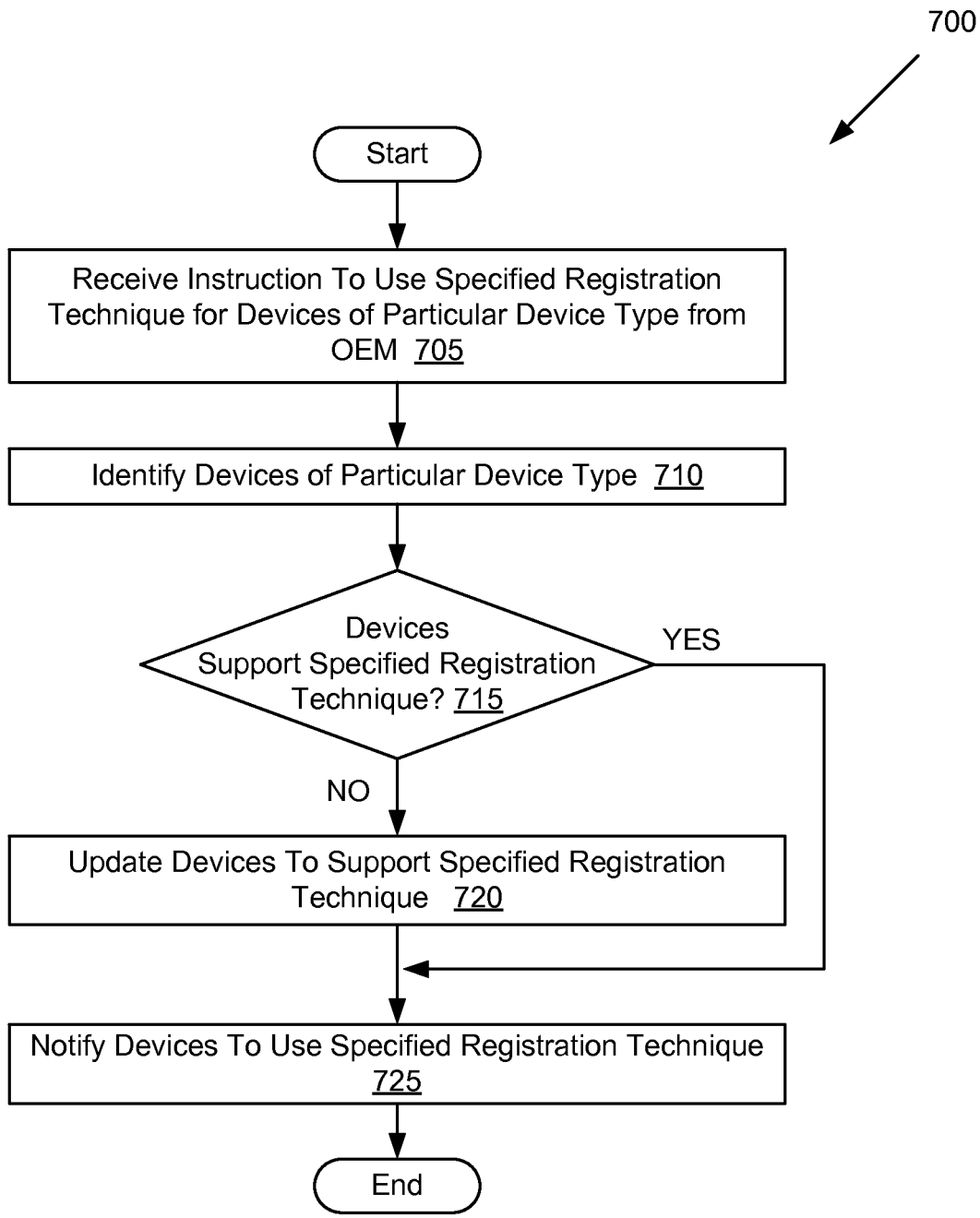
FIG. 7 is a flow chart of one embodiment for a method of updating the registration technique to be applied by devices of a particular device type.

FIG. 7 is a flow chart of one embodiment for a method 700 of updating the registration technique to be applied by devices of a particular device type. In one embodiment, method 700 is performed by a server computing device executing a registration service. At block 705 of method 700, processing logic receives an instruction to use a specified registration technique for devices of a particular device type. The instruction may be received from an OEM that manufactures the devices.

At block 710, processing logic identifies devices of the particular device type. At block 715, processing logic determines whether the devices support the specified registration technique. If all of the devices support the determined registration technique, the method continues to block 725. If there are devices that do not support the selected registration technique, the method continues to block 720.

At block 720, processing logic updates those identified devices that do not support the registration technique to cause those devices to support the registration technique. This may include automatically updating devices after they are sold to a user the first time they are activated in a user's home. In some instances the OEM may not desire to update devices that are in the field (devices that have already been deployed to customer locations). In such an instance, processing logic would only update those devices that have not yet been deployed (e.g., that have not yet been sold to end users).

At block 725, processing logic notifies the devices to use the specified registration technique.

Figure 8:
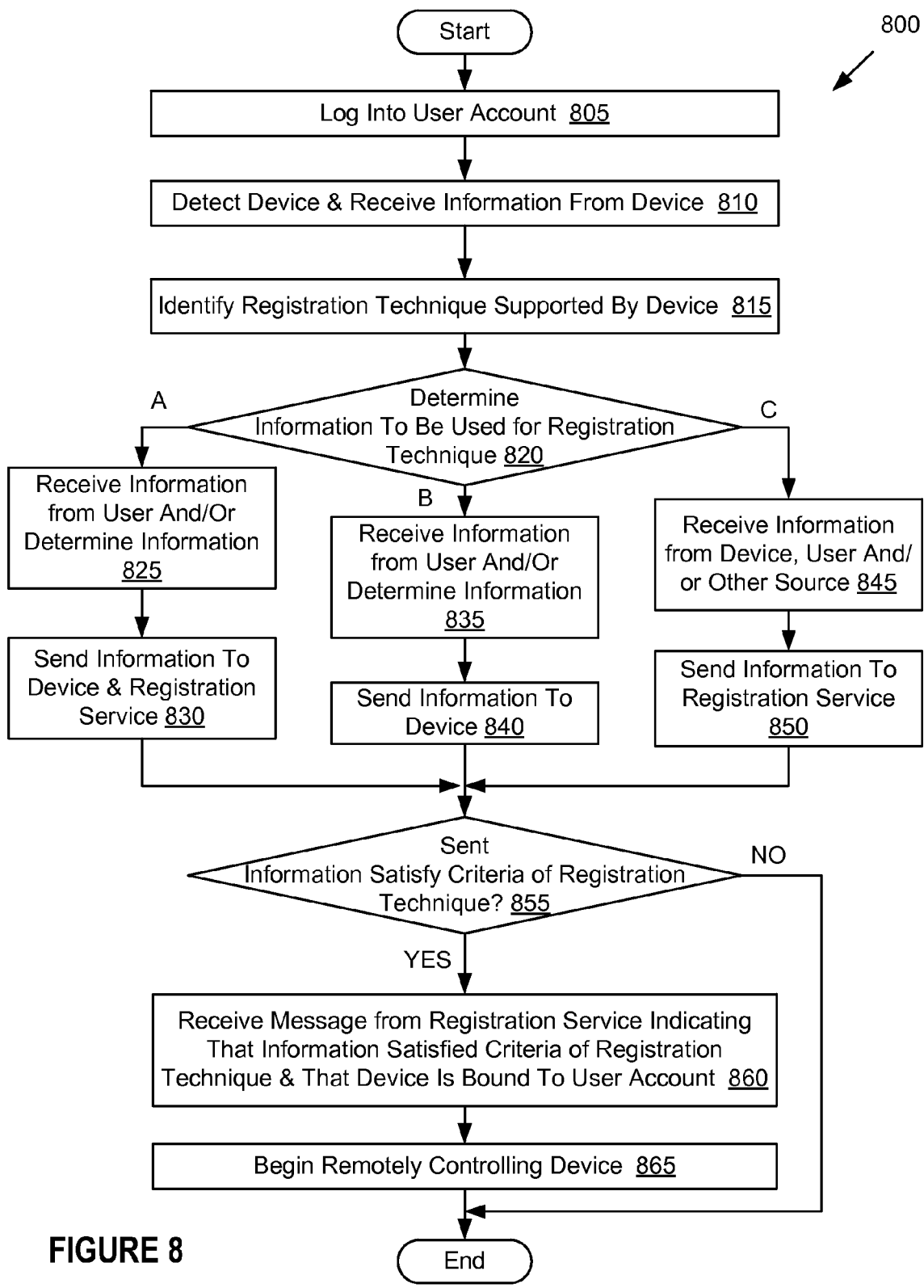
FIG. 8 is a flow chart of one embodiment for a method of performing operations associated with a registration technique by an application.

FIG. 8 is a flow chart of one embodiment for a method 800 of performing operations associated with a registration technique by an application. The application may be a remote control application for embedded systems, and may execute on computing device (e.g., a mobile computing device or traditionally stationary computing device). At block 805 of method 800, processing logic logs into a user account. At block 810, processing logic detects a device (e.g., an unregistered device) and receives information from the device. The information may identify a device type of the device and/or may include unique identifying information of the device.

At block 815, processing logic identifies a registration technique supported by the device. Identifying the registration technique supported by the device may include comparing the unique identifying information and/or device type to a data structure that associates device types with supported registration techniques. Alternatively, identifying the registration technique supported by the device may include sending the received information to a registration service and receiving a notification of a registration technique that should be used to register the device.

At block 820, processing logic determines what registration information is to be used and/or what registration operations are to be performed for the registration technique. Three different types of registration information/operations are discussed, though other options are also possible.

If option A is selected, at block 825 processing logic receives registration information from a user and/or determines registration information. Processing logic may also receive the registration information from another source (e.g., from a web page). At block 830, processing logic then sends the registration information to the device and to a registration service. The device then also forwards the registration information to the registration service.

If option B is selected, at block 835 processing logic receives registration information from the user and/or determines registration information. Processing logic may also receive the registration information from another source. Processing logic then sends the registration information to the device at block 840. The device would then forward the registration information on to the registration service (potentially along with additional registration information determined by the device).

If option C is selected, at block 845 processing logic receives registration information from the device, from a user and/or from another source. At block 850, processing logic sends the registration to the registration service. The device may also send registration information to the registration service.

If at block 855 the sent registration information satisfied registration criteria of the registration technique, the method continues to block 860. At block 860, processing logic receives a message from the registration service indicating that the registration information satisfied the registration criteria of the registration technique and that the device is bound to the user account. At block 865, processing logic may then begin remotely controlling the device.

If at block 855 the registration information failed to satisfy the registration criteria of the registration technique, then the method ends without the device being registered.

Figure 9:
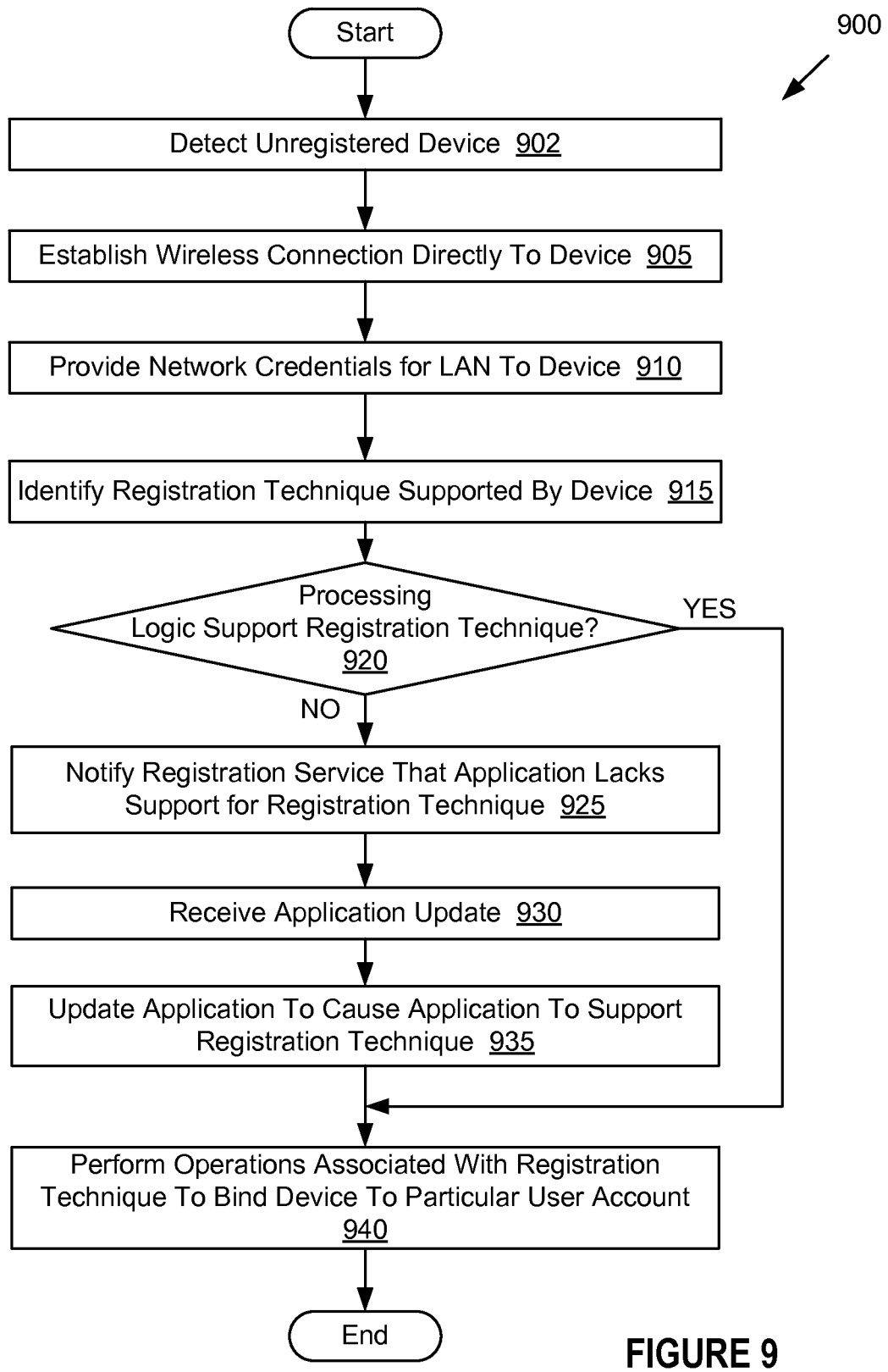
FIG. 9 is a flow chart of another embodiment for a method of performing operations associated with a registration technique by an application.

FIG. 9 is a flow chart of another embodiment for a method 900 of performing operations associated with a registration technique by an application. The application may execute on a computing device (e.g., on a mobile computing device or traditionally stationary computing device). Method 900 may be performed by a computing device executing the application. At block 902 of method 900, processing logic detects an unregistered device. At block 905, processing logic establishes a wireless connection directly to the unregistered device. In one embodiment, processing logic establishes a Bluetooth connection with the device. Alternatively, processing logic may establish a Zigbee connection, a Z-wave connection, a wireless universal serial bus (USB) connection, or another wireless connection. In one embodiment, the unregistered device provides a wireless access point using Wi-Fi. Processing logic may connect to the device by joining the wireless access point provided by the unregistered device.

At block 910, processing logic provides to the unregistered device network credentials for a LAN that the computing device is connected to. The network credentials may include a password for joining the LAN. The network credentials are provided to the unregistered device using the wireless connection with the unregistered device. The unregistered device may use the network credentials to connect to the LAN (e.g., a LAN that includes a wireless access point). Once the unregistered device is connected to the LAN, the unregistered device may establish a connection to one or more WAN accessible services (e.g., to a registration service and/or to a device service).

At block 915, processing logic identifies a registration technique supported by the device (e.g., by querying a registration service). At block 920, processing logic determines whether the application supports the identified registration technique. If the application supports the identified registration technique, the method continues to block 940. If the application fails to support the identified registration technique, then at block 925 processing logic may notify the registration service of the lack of support. At block 930, processing logic may then receive an application update that will cause the application to support the registration technique. Alternatively, the registration service may automatically determine that the application does not support the registration technique and may automatically download the application update to the computing device. In such an embodiment the operations of block 925 may be skipped.

At block 935, processing logic updates the application to cause the application to support the registration technique. At block 940, processing logic performs one or more operations associated with the registration technique to bind the unregistered device to a particular user account. The method then ends.

Figure 10:
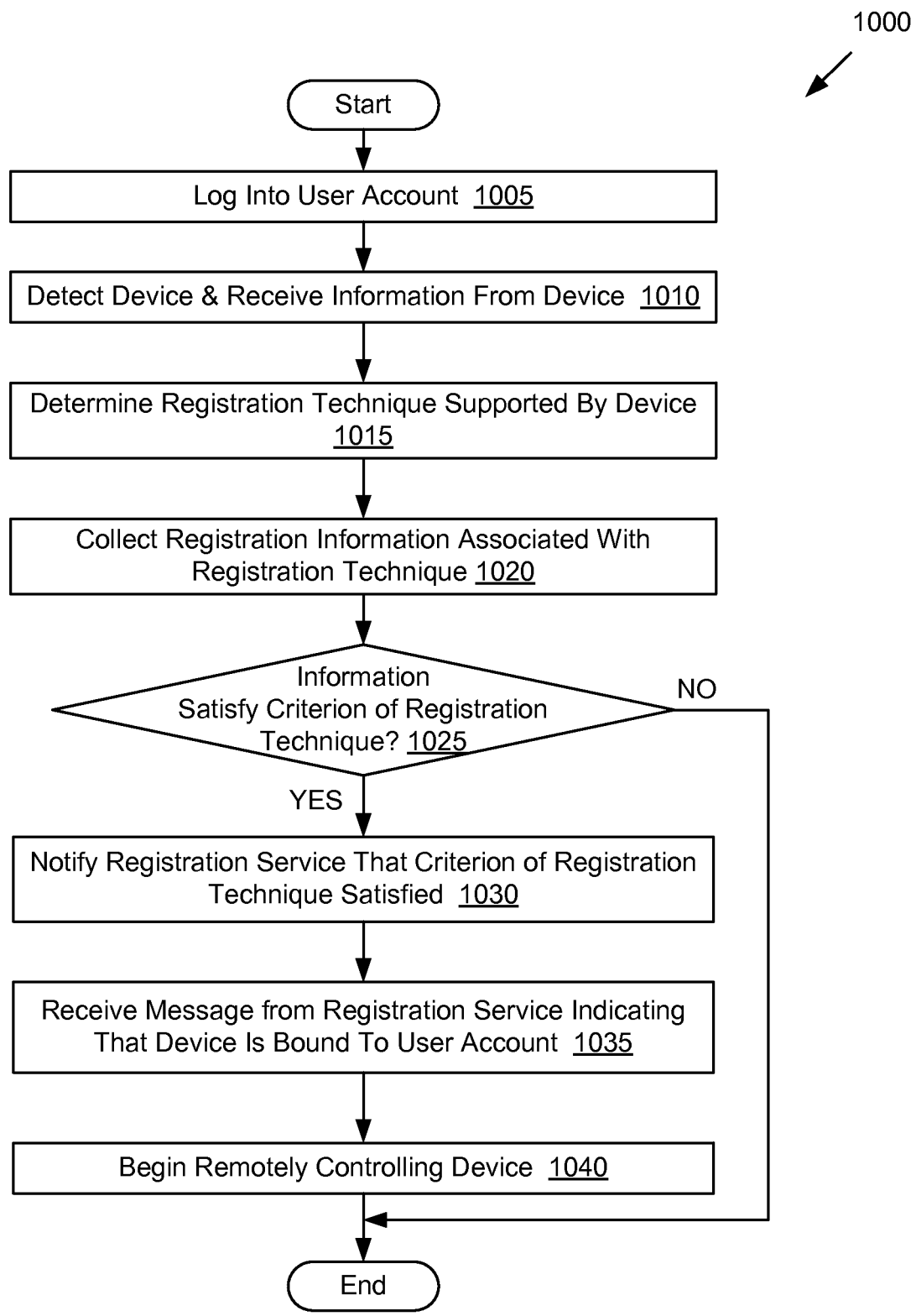
FIG. 10 is a flow chart of yet another embodiment for a method of performing operations associated with a registration technique by an application.

FIG. 10 is a flow chart of yet another embodiment for a method 1000 of performing operations associated with a registration technique by an application. Method 1000 may be performed by a computing device executing the application. At block 1005 of method 1000, processing logic logs into a user account of a user account service. This may include providing a username and password and/or other login credentials. At block 1010, processing logic detects an unregistered device and receives information from the device. At block 1015, processing logic determines a registration technique supported by the unregistered device. This determination may be made based on the received data.

At block 1020, processing logic collects data associated with the registration technique. Processing logic may prompt a user to input registration information (e.g., to type in a code). Alternatively, or additionally, processing logic may receive registration information such as a unique token from the unregistered device. Alternatively, or additionally, processing logic may receive an identification of a web site that processing logic may navigate to. The web site may provide processing logic with registration information. Registration information may also be received from other sources.

At block 1025, processing logic determines whether the collected registration information satisfies a registration criterion of the registration technique. If the registration information satisfies the registration criterion, the method continues to lock 1030. Otherwise the method ends without the unregistered device being registered.

At block 1030, processing logic notifies a registration service that the criterion of the registration criterion has been satisfied. The registration service may then bind the unregistered device to the user account. At block 1035, processing logic receives a message from the registration service indicating that the device is bound to the user account. At block 1040, processing logic may then begin remotely controlling the device.

Figure 11:
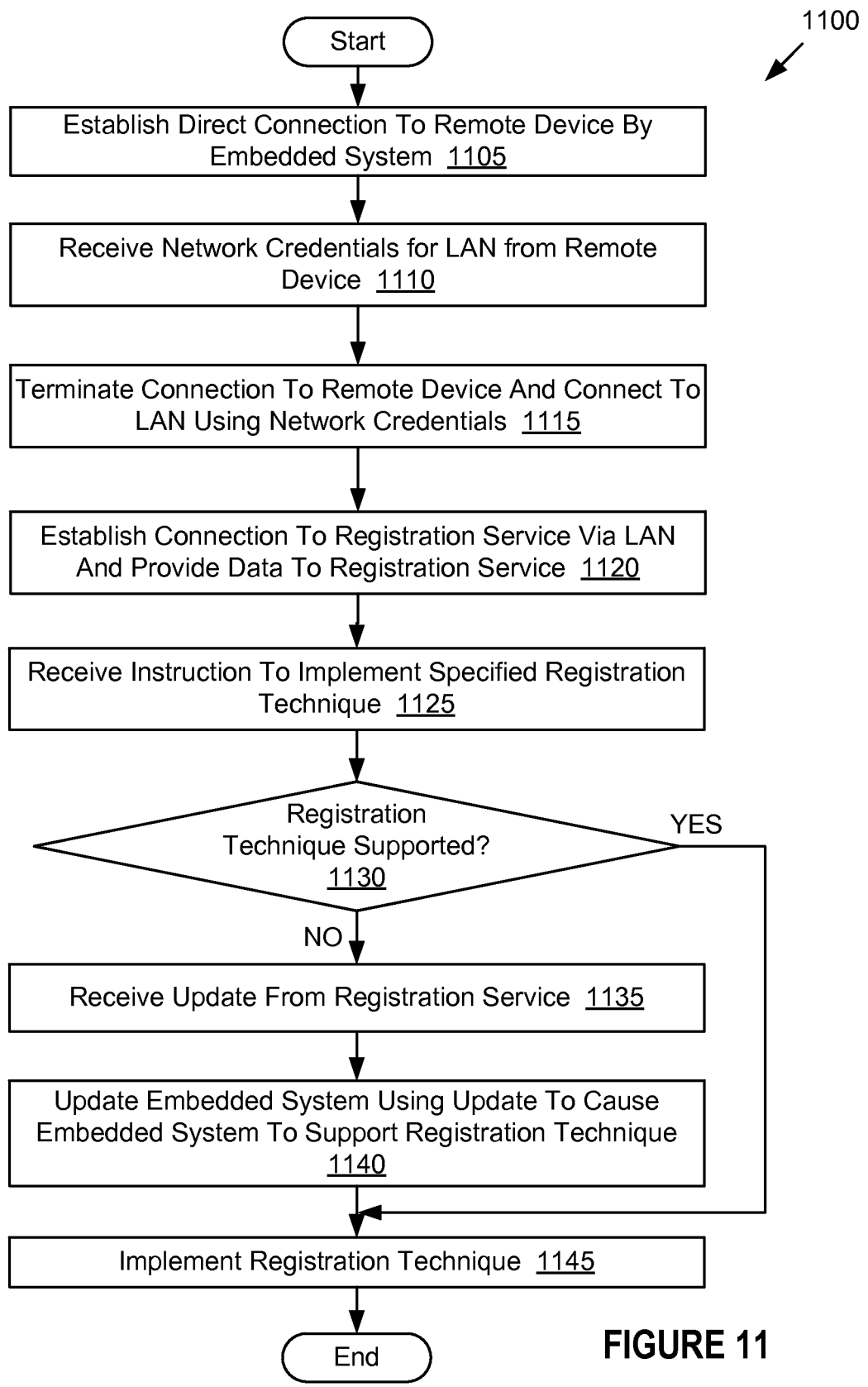
FIG. 11 is a flow chart of one embodiment for a method of performing operations associated with a registration technique by an embedded system or other device.

FIG. 11 is a flow chart of one embodiment for a method 1100 of performing operations associated with a registration technique by an embedded system or other device. At block 1105 of method 1100, processing logic establishes a direct connection to a remote device running a remote control application. At block 1110, processing logic receives network credentials for a LAN from the remote device. At block 1115, processing logic terminates the connection to the remote device and connects to the LAN using the received network credentials.

At block 1120, processing logic establishes a connection to a registration service via the LAN. Processing logic may provide data to the registration service that the registration service may use to identify the embedded system or other device that includes the processing logic. For example, processing logic may provide a serial number, MAC address, or other uniquely identifying information to the registration service.

At block 1125, processing logic receives an instruction to implement a specified registration technique from the registration service. Prior to receiving the instruction, the processing logic may or may not have a capability to implement the registration technique. At block 1130, if the processing logic does not support the registration technique then the method continues to block 1135. If at block 1130 the processing logic does support the registration technique, the method proceeds to block 1145.

At block 1135, processing logic receives an update from the registration service. At block 1140, processing logic executes the update. The update updates a firmware of the embedded system or other device to cause the embedded system or other device to support the registration technique.

At block 1145, processing logic implements the registration technique. This may include providing registration information to the registration service and/or a remote control application, receiving registration information from the remote control application, and/or performing other operations.

Figure 12:
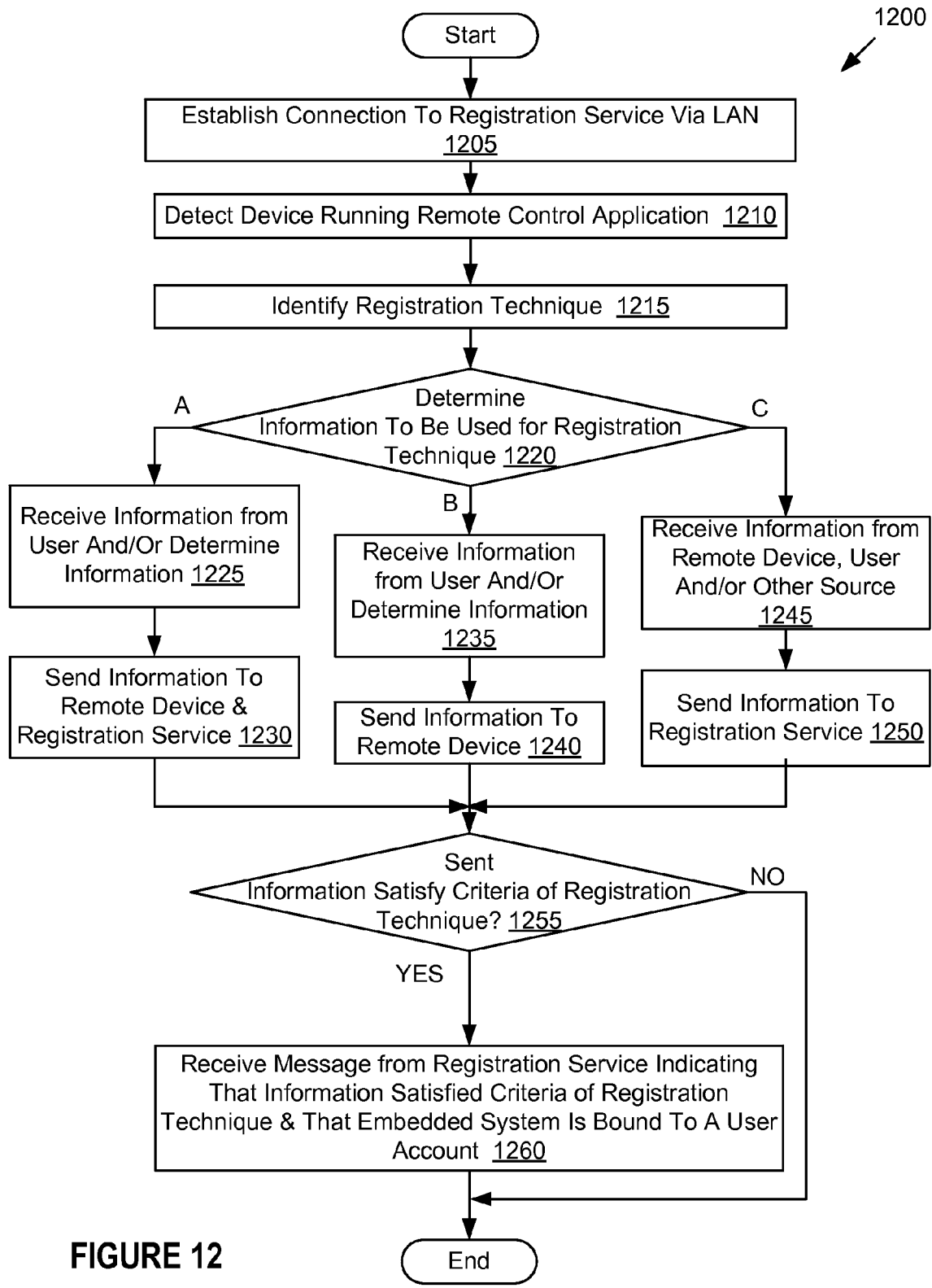
FIG. 12 is a flow chart of another embodiment for a method of performing operations associated with a registration technique by an embedded system or other device.

FIG. 12 is a flow chart of another embodiment for a method 1200 of performing operations associated with a registration technique by an embedded system or other device. At block 1205 of method 1200, processing logic establishes a connection to a registration service via a LAN. Alternatively, processing logic may connect to a wireless carrier (e.g., Sprint, T-Mobile, Verizon, etc.), and may establish the connection to the registration service via the connection to the wireless carrier.

At block 1210, processing logic detects a device running a remote control application. Processing logic may identify the device on a list of devices connected to a LAN, or may detect the device using a protocol such as Bluetooth, Zigbee, and so forth.

At block 1215, processing logic identifies a registration technique to use. In one embodiment, processing logic queries the registration service regarding capabilities of the remote control application and receives a response identifying supported registration techniques of the remote control application. Alternatively, processing logic may query the remote control application regarding the remote control application's capabilities. Processing logic may receive a response that indicates supported registration techniques of the remote control application. Alternatively, processing logic may include a data structure that identifies registration techniques supported by various remote control applications. Processing logic may search the data structure for an entry corresponding to the remote control application to identify supported registration techniques of the remote control application.

Processing logic may then select a registration technique that is supported by both the embedded system and the remote control application. In an alternative embodiment, processing logic queries the registration service, and receives an instruction to use a particular registration technique from the registration service.

At block 1220, processing logic determines what registration information is to be used and/or what registration operations are to be performed for the registration technique. Three different types of registration information/operations are discussed, though other options are also possible.

If option A is selected, at block 1225 processing logic receives registration information from a user and/or determines registration information. Processing logic may also receive the registration information from another source (e.g., from a web page). At block 1230, processing logic then sends the registration information to the remote control application and to a registration service. The remote control application then also forwards the registration information to the registration service.

If option B is selected, at block 1235 processing logic receives registration information from the user and/or determines registration information. Processing logic may also receive the registration information from another source. Processing logic then sends the registration information to the remote control application at block 1240. The remote control application would then forward the registration information on to the registration service (potentially along with additional registration information determined by the remote control application).

If option C is selected, at block 1245 processing logic receives registration information from the remote control application, from a user and/or from another source. At block 1250, processing logic sends the registration to the registration service. The remote control application may also send registration information to the registration service.

If at block 1255 the sent registration information satisfied registration criteria of the registration technique, the method continues to block 1260. At block 1260, processing logic receives a message from the registration service indicating that the registration information satisfied the registration criteria of the registration technique and that the embedded system is bound to the user account.

If at block 1255 the registration information failed to satisfy the registration criteria of the registration technique, then the method ends without the embedded system being registered.

Figure 13:
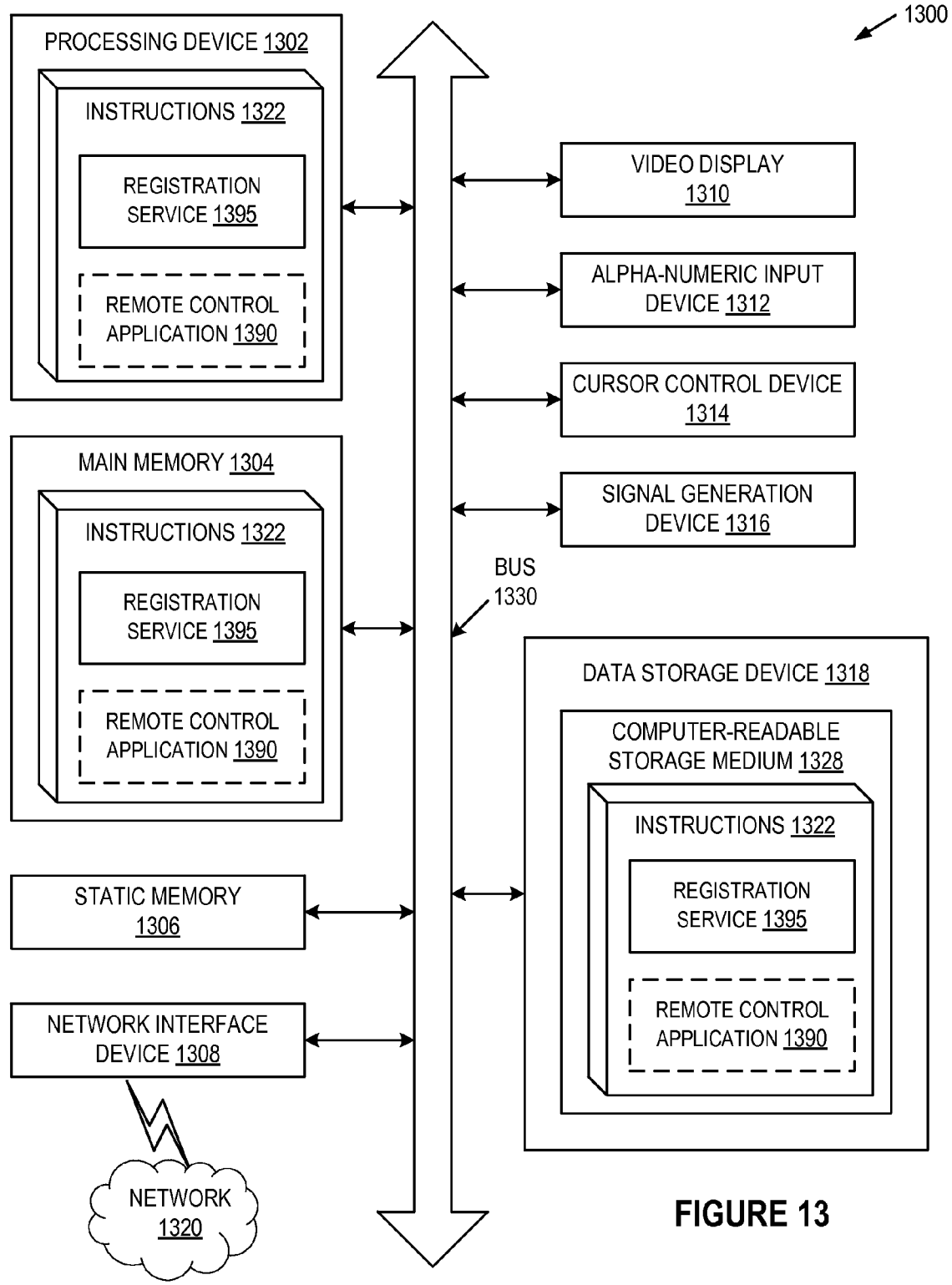
FIG. 13 illustrates a block diagram of one embodiment of a computing device.

FIG. 13 illustrates a diagrammatic representation of a machine in the example form of a computing device 1300 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a secondary memory (e.g., a data storage device 1318), which communicate with each other via a bus 1330.

Processing device 1302 represents one or more general-purpose processors such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. Processing device 1302 is configured to execute the processing logic (instructions 1322) for performing the operations and steps discussed herein.

The computing device 1300 may further include a network interface device 1308. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker).

The data storage device 1318 may include a machine-readable storage medium (or more specifically a computer-readable storage medium) 1328 on which is stored one or more sets of instructions 1322 embodying any one or more of the methodologies or functions described herein. The instructions 1322 may also reside, completely or at least partially, within the main memory 1304 and/or within the processing device 1302 during execution thereof by the computer system 1300, the main memory 1304 and the processing device 1302 also constituting computer-readable storage media.

The computer-readable storage medium 1328 may also be used to store a registration service 1395 or a remote control application 1390 (as described with reference to FIG. 2), and/or a software library containing methods that call an a registration service 1395 or remote control application 1390. While the computer-readable storage medium 1328 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

Figure 14:
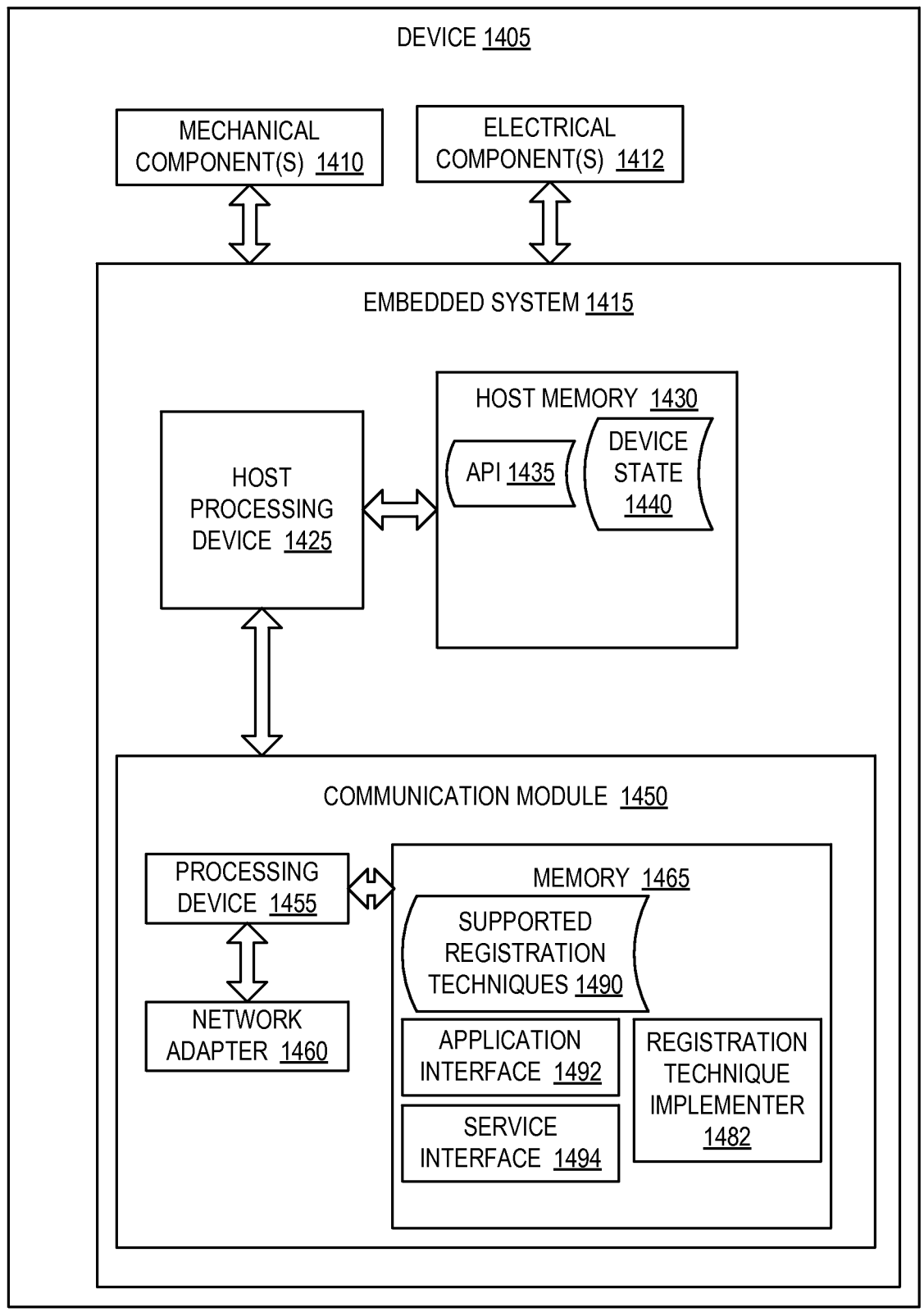
FIG. 14 is a block diagram of an example device having a remotely accessible embedded system.

FIG. 14 is a block diagram of an example device 1405 having a remotely accessible embedded system 1415. The device may include any of the aforementioned types of devices having an embedded system, and in one embodiment corresponds to a device 135A-C of FIG. 1. In one embodiment, the device 1405 includes mechanical components 1410, electrical components 1412 and an embedded system 1415. The electrical components 1412 and/or mechanical components 1410 may include sensors, programmable logic controllers (PLCs), switches, motors, valves, actuators, and so forth.

The embedded system 1415 may include a host processing device 1425, a host memory 1430 and/or a communication module 1450 coupled to the host processing device 1425. The embedded system 1415 may also include numerous other components that are not shown herein. Examples of such additional components may include light emitting diodes (LEDs), a power supply regulator, fuses, ports, a user interface, digital to analog (D/A) converters, analog to digital (A/D) converters, field programmable gate arrays (FPGAs), application specific integrated circuits (ASICs), and so on.

Host processing device 1425 may be a microcontroller or a digital signal processor (DSP) in one embodiment. Host processing device 1425 may alternatively or additionally include a programmable logic controller (PLC), a field programmable gate array (FPGA) or a complex programmable logic device (CPLD). The host processing device 1425 may be configured to perform specific functions related to the operation and control of the device 1405.

Host memory 1430 may include random access memory (RAM), read only memory (ROM), one time programmable (OTP) ROM, Flash (e.g., NOR Flash), or other types of memory. Host memory 1430 may store an application programming interface (API) 1435 for the communication module 1450. The API 1435 may enable the host processing device 1425 to send commands and/or data to and receive commands and/or data from communication module 1450.

Host memory 1430 may additionally include a device state 1440 for the device 1405. The device state 1440 may include a present device state, historical device state, and/or changes made to the device state over a particular period. For example, device state 1440 in one embodiment includes changes made to the device's state since a connection to a device service was lost. Host memory 1430 may also include firmware for the host processing device 1425 that configures the host processing device to perform one or more operations that are specific to device 1405.

In some embodiments, the host memory 1430 may be integrated into the host processing device 1425. For example, microcontrollers typically include a processor core, memory and programmable input/output peripherals. Accordingly, if the host processing device 1425 is a microcontroller, then host memory 1430 may be a memory of host processing device 1425.

Communication module 1450 may be an integrated circuit (IC) that is configured to be coupled to host processing device 1425 of embedded system 1415. Communication module 1450 may be provided by a third party to a manufacturer of the device along with the API 1435, and may enable network capability and remote control capability to be easily added to the device 1405. The communication module 1450 may include its own processing device 1455, a memory 1465 and/or a network adapter 1460. The processing device 1455 may be a microcontroller, a DSP, a PLC, a microprocessor or programmable logic device such as an FPGA or a CPLD. The memory may include a non-volatile memory (e.g., RAM) and/or a volatile memory (e.g., ROM, Flash, etc.). In one embodiment, memory 1465 is integrated into processing device 1455.

Memory 1465 may store one or more supported registration techniques 1490. Memory 1465 may also store other firmware for the processing device 1455, such as firmware that includes instructions for an application interface 1492, a service interface 1494 and/or a registration technique implementer 1482.

Network adapter 1455 may be a wired network adapter (e.g., an Ethernet adapter) or a wireless network adapter (e.g., a Wi-Fi adapter or other wireless local area network (WLAN) adapter). Network adapter 1460 may also be configured to provide connection to a network or other devices using Zigbee, PLC, Bluetooth, 6LowPAN, or other communication protocols. Network adapter 1460 may receive notifications and other messages from a registration service, device service and/or remote control applications. Network adapter 1460 may additional send outgoing messages to the registration service, device service and/or to remote control applications.

Service interface 1494 may be executed by processing device 1455 to operate on messages and notifications received from a WAN accessible service such as the registration service or device service. Similarly, application interface 1492 may be executed by processing device 1455 to operate on messages and notifications received from remote control applications. Registration technique implementer 1482 may be executed by processing device 1455 to perform operations associated with a supported registration technique 1490.

The modules, components and other features described herein (for example in relation to FIGS. 1-2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "sending", "determining", "identifying", "collecting", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving, by a processing device executing an application that is logged in to a user account recognized by a registration service, information identifying a device that has not been bound to any user account, wherein the application supports a plurality of registration techniques, and wherein the plurality of registration techniques comprise a first registration technique with a first security level and a second registration technique with a second security level, wherein the second security level is different than the first security level;
    identifying, by the processing device, a registration technique supported by the device that is to be used for registration of the device, wherein the registration technique comprises 1) a criterion that must be satisfied in order for the device to be bound to the user account and 2) one or more first registration operations to be performed by the device, and one or more second registration operations to be performed by the application, to cause the criterion to be satisfied;
    performing at least one of sending information associated with the registration technique to the device or receiving the information associated with the registration technique;
    sending the information associated with the registration technique to the registration service; and
    receiving, by the processing device, a message from the registration service, wherein the message indicates that the information satisfied a criterion of the registration technique and comprises a notification that the device is bound to the user account.

2. The method of claim 1, further comprising:
    after the device is bound to the user account, receiving information identifying a state of the device;
    receiving a user input to change a setting of the device; and
    sending a command for changing the setting to a device service, wherein the device service is to forward the command to the device.

3. The method of claim 1, further comprising:
    determining that the application fails to support the registration technique;
    notifying the registration service that the application fails to support the registration technique;
    receiving an application update responsive to notifying the registration service; and
    updating the application using the application update to cause the application to support the registration technique.

4. The method of claim 1, wherein identifying the registration technique supported by the device comprises:
    sending information identifying the device to the registration service; and
    receiving instructions to use the registration technique responsive to sending the information.

5. The method of claim 1, wherein identifying the registration technique supported by the device comprises:
    determining a device type of the device; and
    determining the registration technique based on the device type, wherein the registration technique is one of the plurality of registration techniques supported by the application.

6. The method of claim 5, further comprising:
    determining that the device supports a plurality of registration techniques based on the device type; and
    determining, from the plurality of registration techniques supported by the application and from the plurality of registration techniques supported by the device, that the registration technique is supported by both the application and the device.

7. The method of claim 1, further comprising:
    connecting to a local area network (LAN); and
    responsive to detecting the device, sending network credentials for the LAN to the device, wherein the network credentials enable the device to establish a connection to the LAN, and through the LAN to the registration service.

8. The method of claim 1, further comprising:
    receiving information identifying an additional device that has not been bound to any user account;
    identifying an additional registration technique supported by the additional device that is to be used for registration of the additional device;
    receiving additional information associated with the additional registration technique;
    providing the additional information to the registration service; and
    receiving an additional message from the registration service, wherein the additional message indicates that the additional information satisfied a criterion of the additional registration technique and comprises a notification that the additional device is bound to the user account.

9. The method of claim 1, further comprising:
logging the application out of the user account;
logging the application in to an additional user account;
receiving information identifying an additional device that has not been bound to any user account;
identifying an additional registration technique supported by the additional device that is to be used for registration of the additional device;
receiving information associated with the additional registration technique;
providing the information associated with the additional registration technique to the registration service; and
receiving an additional message from the registration service, wherein the additional message indicates that the additional information satisfied an additional criterion of the additional registration technique and comprises a notification that the additional device is bound to the additional user account.

10. The method of claim 1, wherein the processing device comprises a processing device for a mobile device, and wherein the device comprises an embedded system.

11. A non-transitory computer readable storage medium comprising instructions for an application that, when executed by a processing device, cause the processing device to perform operations comprising:
receiving, by the processing device, information identifying a device that has not been bound to any user account, wherein the application supports a plurality of registration techniques, wherein the application is logged in to a user account recognized by a registration service, and wherein the plurality of registration techniques comprise a first registration technique with a first security level and a second registration technique with a second security level, wherein the second security level is different than the first security level;
identifying, by the processing device, a registration technique supported by the device that is to be used for registration of the device, wherein the registration technique comprises 1) a criterion that must be satisfied in order for the device to be bound to the user account and 2) one or more first registration operations to be performed by the device, and one or more second registration operations to be performed by the application, to cause the criterion to be satisfied;
performing at least one of sending information associated with the registration technique to the device or receiving the information associated with the registration technique;
sending the information associated with the registration technique to the registration service; and
receiving, by the processing device, a message from the registration service, wherein the message indicates that the information satisfied a criterion of the registration technique and comprises a notification that the device is bound to the user account.

12. The non-transitory computer readable storage medium of claim 11, the operations further comprising:
after the device is bound to the user account, receiving information identifying a state of the device;
receiving a user input to change a setting of the device; and
sending a command for changing the setting to a device service, wherein the device service is to forward the command to the device.

13. The non-transitory computer readable storage medium of claim 11, the operations further comprising:
determining that the application fails to support the registration technique;
notifying the registration service that the application fails to support the registration technique;
receiving an application update responsive to notifying the registration service; and
updating the application using the application update to cause the application to support the registration technique.

14. The non-transitory computer readable storage medium of claim 11, wherein identifying the registration technique supported by the device comprises:
sending information identifying the device to the registration service; and
receiving instructions to use the registration technique responsive to sending the information.

15. The non-transitory computer readable storage medium of claim 11, wherein identifying the registration technique supported by the device comprises:
determining a device type of the device; and
determining the registration technique based on the device type, wherein the registration technique is one of the plurality of registration techniques supported by the application.

16. The non-transitory computer readable storage medium of claim 15, the operations further comprising:
determining that the device supports a plurality of registration techniques based on the device type; and
determining, from the plurality of registration techniques supported by the application and from the plurality of registration techniques supported by the device, that the registration technique is supported by both the application and the device.

17. The non-transitory computer readable storage medium of claim 11, the operations further comprising:
connecting to a local area network (LAN); and
responsive to detecting the device, sending network credentials for the LAN to the device, wherein the network credentials enable the device to establish a connection to the LAN, and through the LAN to the registration service.

18. The non-transitory computer readable storage medium of claim 11, the operations further comprising:
receiving information identifying an additional device that has not been bound to any user account;
identifying an additional registration technique supported by the additional device that is to be used for registration of the additional device;
receiving additional information associated with the additional registration technique;
providing the additional information to the registration service; and
receiving an additional message from the registration service, wherein the additional message indicates that the additional information satisfied a criterion of the additional registration technique and comprises a notification that the additional device is bound to the user account.

19. The non-transitory computer readable storage medium of claim 11, the operations further comprising:
logging the application out of the user account;
logging the application in to an additional user account;
receiving information identifying an additional device that has not been bound to any user account;
identifying an additional registration technique supported by the additional device that is to be used for registration of the additional device;

receiving information associated with the additional registration technique;

providing the information associated with the additional registration technique to the registration service; and receiving an additional message from the registration service, wherein the additional message indicates that the additional information satisfied an additional criterion of the additional registration technique and comprises a notification that the additional device is bound to the additional user account.

20. A mobile device comprising:

a wireless module;

a memory to store instructions for a remote control application; and a processing device, coupled to the wireless module and to the memory, to execute the instructions for the application, wherein the instructions cause the processing device to:

receive information identifying a device that has not been bound to any user account, wherein the application supports a plurality of registration techniques, wherein the application is logged in to a user account recognized by a registration service, and wherein the plurality of registration techniques comprise a first registration technique with a first security level and a second registration technique with a second security level, wherein the second security level is different than the first security level;

identify a registration technique supported by the device that is to be used for registration of the device, wherein the registration technique comprises 1) a criterion that must be satisfied in order for the device to be bound to the user account and 2) one or more first registration operations to be performed by the device, and one or more second registration operations to be performed by the application, to cause the criterion to be satisfied;

determine information associated with the registration technique;

send the information associated with the registration technique to the registration service; and receive a message from the registration service, wherein the message indicates that the information satisfied a criterion of the registration technique and comprises a notification that the device is bound to the user account.

* * * * *